(12) United States Patent
Yoshida

(10) Patent No.: US 10,732,461 B2
(45) Date of Patent: Aug. 4, 2020

(54) DISPLAY DEVICE AND ILLUMINATION DEVICE

(71) Applicant: SEIKO EPSON CORPORATION, Tokyo (JP)

(72) Inventor: Shohei Yoshida, Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 65 days.

(21) Appl. No.: 15/988,199

(22) Filed: May 24, 2018

(65) Prior Publication Data

US 2018/0348562 A1 Dec. 6, 2018

(30) Foreign Application Priority Data

May 31, 2017 (JP) .................................. 2017-108816

(51) Int. Cl.
*G02F 1/13357* (2006.01)
*G02F 1/13363* (2006.01)
(Continued)

(52) U.S. Cl.
CPC ..... *G02F 1/13362* (2013.01); *G02B 27/0172* (2013.01); *G02B 27/144* (2013.01); *G02F 1/13363* (2013.01); *G02F 1/133528* (2013.01); *G02F 1/133605* (2013.01); *G02B 2027/0118* (2013.01); *G02B 2027/0194* (2013.01); *G02F 2001/133638* (2013.01)

(58) Field of Classification Search
CPC ............. G02F 1/13362; G02F 1/13363; G02F 1/133528; G02F 1/133605; G02F 2001/133638; G02B 27/0172
See application file for complete search history.

(56) References Cited

U.S. PATENT DOCUMENTS 8,885,259 B2* 11/2014 Mukawa .............. G02B 3/0056
345/7
10,228,563 B2* 3/2019 Yu .......................... G02B 27/01
(Continued)

FOREIGN PATENT DOCUMENTS

JP 2006-003872 A 1/2006
JP 2012-008356 A 1/2012
(Continued)

*Primary Examiner* — Edward J Glick
*Assistant Examiner* — Anthony G Quash
(74) *Attorney, Agent, or Firm* — Oliff PLC

(57) ABSTRACT

A display device according to the invention includes a light guiding body that guides image light, an incidence portion that makes the image light incident on the light guiding body, and an emission portion that makes the image light emitted from the light guiding body. The emission portion includes a plurality of partially reflecting mirrors, and is configured with a first partially reflecting mirror group having a relatively high reflectance of S-polarized light components and a second partially reflecting mirror group having a relatively high reflectance of the P-polarized light components. The first partially reflecting mirror and the second partially reflecting mirror are alternately arranged in an arrangement direction, and emit light of a polarized state including S-polarized light components and P-polarized light components.

19 Claims, 12 Drawing Sheets

(51) Int. Cl.
*G02F 1/1335* (2006.01)
*G02B 27/01* (2006.01)
*G02B 27/14* (2006.01)

(56) References Cited

U.S. PATENT DOCUMENTS

| | | | |
|---|---|---|---|
| 2007/0008624 A1 | 1/2007 | Hirayama | |
| 2007/0070859 A1 | 3/2007 | Hirayama | |
| 2008/0151379 A1* | 6/2008 | Amitai | G02B 6/0055 359/630 |
| 2009/0015929 A1* | 1/2009 | DeJong | G02B 27/0081 359/633 |
| 2010/0202048 A1* | 8/2010 | Amitai | H04N 13/344 359/485.02 |
| 2011/0317233 A1 | 12/2011 | Hayashibe et al. | |
| 2016/0077335 A1* | 3/2016 | An | G02B 27/0101 362/19 |
| 2016/0124229 A1* | 5/2016 | Yokoyama | G02B 27/0172 359/567 |
| 2017/0219830 A1 | 8/2017 | Komatsu et al. | |
| 2017/0293143 A1* | 10/2017 | Martinez | G02B 27/01 |
| 2018/0081177 A1* | 3/2018 | Yoshida | G02B 27/0172 |

FOREIGN PATENT DOCUMENTS

| | | |
|---|---|---|
| JP | 2017-003845 A | 1/2017 |
| WO | 2005/088384 A1 | 9/2005 |

* cited by examiner

DISPLAY DEVICE AND ILLUMINATION DEVICE

BACKGROUND

1. Technical Field

The present invention relates to a display device and an illumination device.

2. Related Art

Recently, an image display device of a type used by being worn on the head of an observer such as a head-mounted display is provided as one of wearable information devices. There is also known an image display device capable of recognizing simultaneously and visually both an image generated by a display element and an external image when the observer wears the image display device, that is, a so-called see-through type image display device.

JP-A-2012-008356 discloses an image display device that includes a light source and scanning means including a first mirror, first light deflection means, a second mirror, and second light deflection means, and that guides light emitted from the second light deflection means to the eye of the observer. JP-A-2012-008356 discloses that each of a plurality of semi-transmitting films configuring the second light deflection means reflects either S-polarized light components or P-polarized light components and transmits the other polarized light components.

International Publication No. 2005/088384 discloses an image display device including an image display optical system that includes a substrate with light transmittance and a deflection optical portion configured by multiple mirrors. International Publication No. 2005/088384 discloses that the multiple mirrors include a plurality of micro reflection surfaces inclined with respect to a normal line of the substrate, and that a micro reflection surface is optimally designed in accordance with a polarized light state of incident light.

The image display devices described in JP-A-2012-008356 and International Publication No. 2005/088384 are based on the assumption that all the semi-transmitting films or all the micro reflection surfaces have the same reflection characteristics. The image display devices have a problem that striped unevenness is viewed on a display image due to a plurality of semi-transmitting film patterns or stripe patterns of the multiple mirrors.

SUMMARY

An advantage of some aspects of the invention is to provide a display device which can reduce viewing of striped unevenness. In addition, another advantage of some aspects of the invention is to provide an illumination device which can reduce viewing of striped unevenness.

According to a first aspect of the invention, there is provided a display device including an image forming device that emits image light; a light guiding body that guides the image light which is emitted from the image forming device; an incidence portion that makes the image light incident on the light guiding body; and an emission portion that makes the image light emitted from the light guiding body. The emission portion includes a plurality of partially reflecting mirrors that are provided in parallel with each other with an interval therebetween, reflect a part of the image light and external light, and transmit the other part of the image light and the external light. The plurality of partially reflecting mirrors include a plurality of first partially reflecting mirrors in which reflectances of S-polarized light components for the partially reflecting mirrors are relatively higher than reflectances of P-polarized light components for the partially reflecting mirrors, and a plurality of second partially reflecting mirrors in which the reflectances of the P-polarized light components are relatively higher than the reflectances of the S-polarized light components. The first partially reflecting mirrors and the second partially reflecting mirrors are alternately arranged in an arrangement direction of the plurality of partially reflecting mirrors. The image forming device emits the image light as light of a polarized state including S-polarized light components and P-polarized light components for the partially reflecting mirrors.

In the configuration, image light of a polarized state including S-polarized light components and P-polarized light components for a partially reflecting mirror at a predetermined ratio is generated, and thereby, intensity of reflected light from a first partially reflecting mirror can be equalized with intensity of reflected light from a second partially reflecting mirror. Thus, there is no difference in an intensity profile of the reflected light emitted from the light guiding body, and thereby, striped unevenness can be hardly viewed. Accordingly, an observer can view image light with high uniformity without unevenness.

In the display device, the image forming device may include a panel unit that emits the image light and an emission side polarizer that is provided on a light emission side of the panel unit, and a direction of a transmission axis of the emission side polarizer may be set such that a direction of a polarization plane of the image light incident on the partially reflecting mirror is different from both directions of an S-polarization plane and P-polarization plane for the partially reflecting mirror.

In the configuration, it is possible to generate image light of a polarized state including S-polarized light components and P-polarized light components for a partially reflecting mirror at a predetermined ratio.

In the display device, the image forming device may include a panel unit that emits the image light, an emission side polarizer that is provided on a light emission side of the panel unit, and a first retardation plate on which light that is emitted from the emission side polarizer is incident.

In the configuration, an angle of an optical axis of a first retardation plate for a transmission axis of an emission side polarizer is adjusted, and thereby, a direction of a polarization plane of image light transmitted through the first retardation plate can be adjusted.

In the display device, the first retardation plate may be a half-wave plate.

In the configuration, an angle of an optical axis of a first retardation plate for a transmission axis of an emission side polarizer is adjusted, and thereby, a polarization plane of image light transmitted through the first retardation plate can be randomly adjusted. Thus, it is possible to generate image light of a polarized state including S-polarized light components and P-polarized light components for a partially reflecting mirror at a predetermined ratio.

In the display device, the first retardation plate may be a quarter-wave plate.

In the configuration, an angle of an optical axis of a first retardation plate for a transmission axis of an emission side polarizer is set, and thereby, image light transmitted through the first retardation plate can be converted into circularly polarized light. It is possible to generate image light of a polarized state including S-polarized light components and P-polarized light components for a partially reflecting mirror at the same ratio.

In the display device, the image forming device may include a laser light source that emits linearly polarized light as the image light, and the laser light source may be installed such that a direction of a polarization plane of the image light incident on the partially reflecting mirror is different from directions of an S-polarization plane and a P-polarization plane for the partially reflecting mirror.

In the configuration, an installation direction of a laser light source is adjusted, and thereby, a polarization plane of image light can be randomly adjusted.

In the display device, the image forming device may include a laser light source that emits linearly polarized light as the image light and a second retardation plate on which the image light that is emitted from the laser light source is incident.

In the configuration, an angle between a polarization plane of image light and an optical axis of a first retardation plate is adjusted, and thereby, a polarization plane of image light transmitted through the first retardation plate can be randomly adjusted. Thus, it is possible to generate image light of a polarized state including S-polarized light components and P-polarized light components for a partially reflecting mirror.

In the display device, the second retardation plate may be a half-wave plate.

In the configuration, an angle between a polarization plane of image light and an optical axis of a first retardation plate is adjusted, and thereby, a polarization plane of image light transmitted through the first retardation plate can be randomly adjusted. Thus, it is possible to generate image light of a polarized state including S-polarized light components and P-polarized light components for a partially reflecting mirror at a predetermined ratio.

In the display device, the second retardation plate may be a quarter-wave plate.

In the configuration, a polarization plane of image light and an optical axis of a second retardation plate are disposed so as to form an angle of 45°, and thereby, image light transmitted through the second retardation plate can be converted into circularly polarized light. Thus, it is possible to generate image light of a polarized state including S-polarized light components and P-polarized light components for a partially reflecting mirror at the same ratio.

In the display device, the image forming device may include a light ray flux enlarging element that enlarges a light flux diameter of the image light, the light ray flux enlarging element may be configured with a diffraction element including a lattice pattern that is configured with a plurality of convex portions extending in one direction, and the image light may be incident on the light ray flux enlarging element as light that vibrates in an extending direction of the plurality of convex portions.

In the configuration, in a case where an image forming device uses a light ray flux enlarging element, a polarization direction of image light incident on a diffraction element is optimized. Accordingly, a light flux diameter of the image light can be favorably enlarged by the diffraction element. Thus, even if a position of an eye of an observer is changed, the image light can be incident, and thus, it is possible for the observer to view a good image without lack in a visual field.

According to a second aspect of the invention, there is provided an illumination device including a light source device that emits illumination light; a light guiding body that guides the illumination light which is emitted from the light source device; an incidence portion that makes the illumination light incident on the light guiding body; and an emission portion that makes the illumination light emitted from the light guiding body. The emission portion includes a plurality of partially reflecting mirrors that are provided in parallel with each other with an interval therebetween, reflect a part of the illumination light and external light, and transmit the other part of the illumination light and the external light. The plurality of partially reflecting mirrors include a plurality of first partially reflecting mirrors in which reflectances of S-polarized light components for the partially reflecting mirrors are relatively higher than reflectances of P-polarized light components for the partially reflecting mirrors, and a plurality of second partially reflecting mirrors in which the reflectances of the P-polarized light components are relatively higher than the reflectances of the S-polarized light components. The first partially reflecting mirrors and the second partially reflecting mirrors are alternately arranged in an arrangement direction of the plurality of partially reflecting mirrors. The light source device emits the illumination light as light of a polarized state including S-polarized light components and P-polarized light components for the partially reflecting mirrors.

In the configuration, image light of a polarized state including S-polarized light components and P-polarized light components for a partially reflecting mirror at a predetermined ratio is generated, and thereby, intensity of reflected light from a first partially reflecting mirror can be equalized with intensity of reflected light from a second partially reflecting mirror. Thus, there is no difference in an intensity profile of the reflected light emitted from the light guiding body, and thereby, striped unevenness can be hardly viewed. Accordingly, an observer can view image light with high uniformity without unevenness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
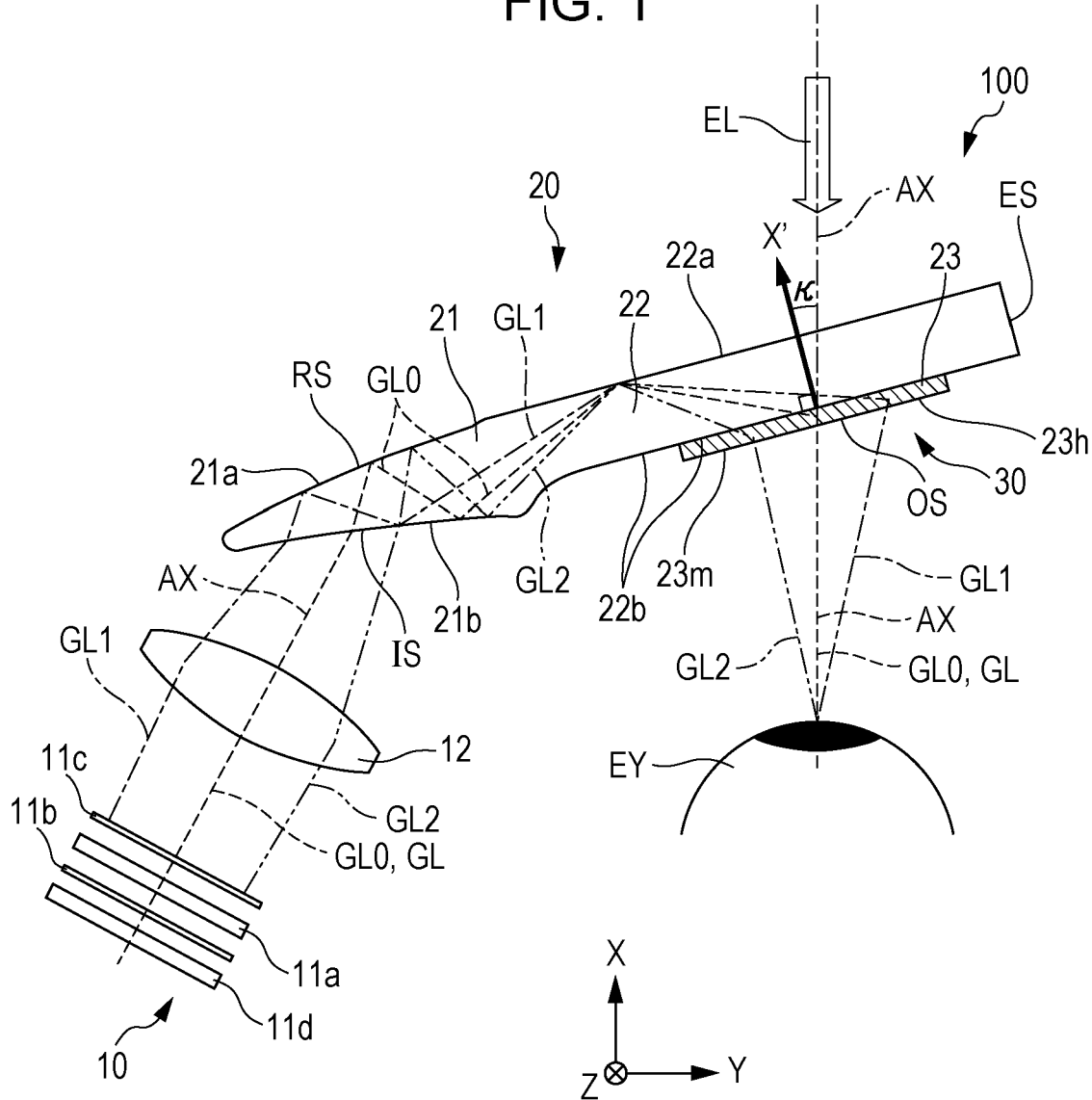
FIG. 1 is a plan view of a display device according to a first embodiment.

Hereinafter, embodiments of the invention will be described in detail with reference to the drawings.

There is a case where a characteristic portion is enlarged to be illustrated in the drawings used in the following description for the sake of convenience so as to easily understand characteristics, and a dimensional ratio of each component is not necessarily the same as the actual.

First Embodiment

Figure 2:
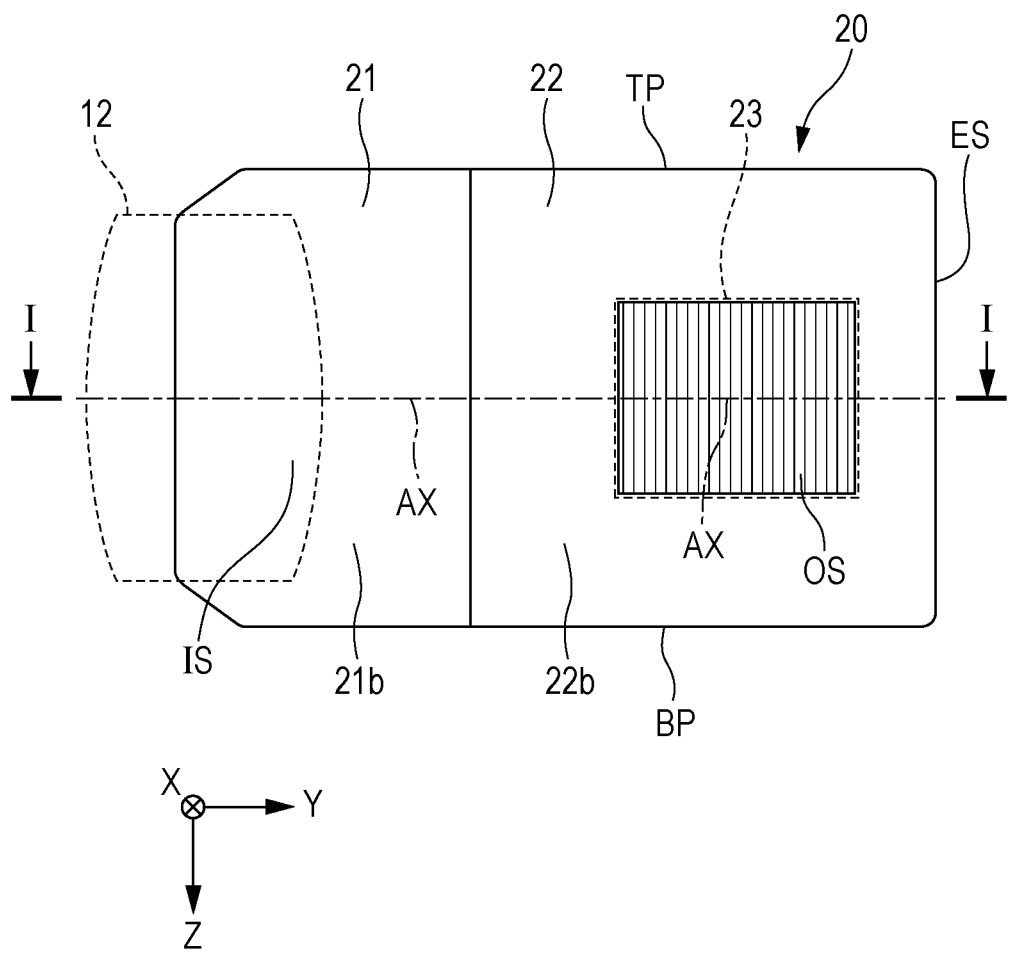
FIG. 2 is a rear view of a light guiding device.
Figure 3:
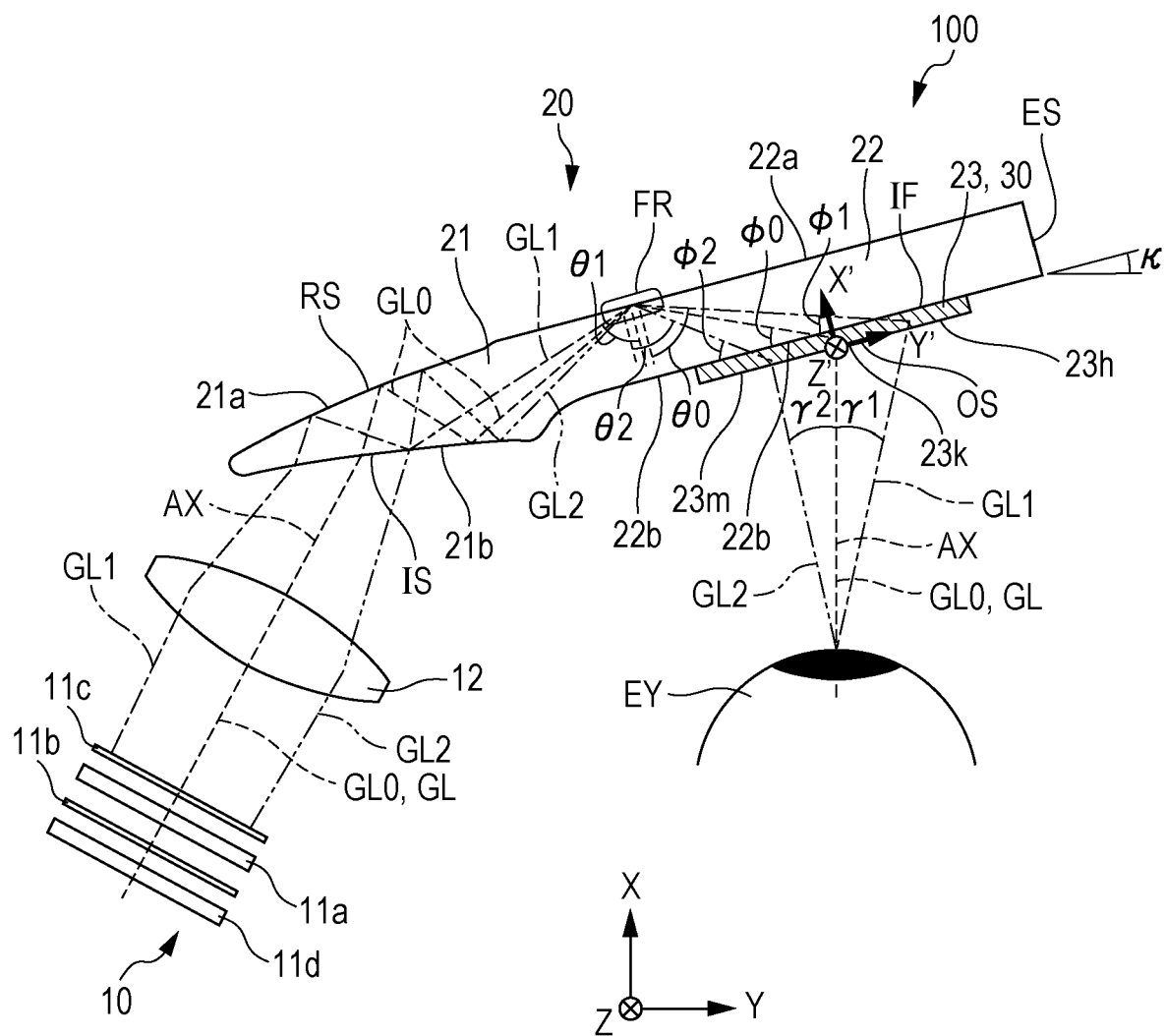
FIG. 3 is a view illustrating a light path of image light in the light guiding device.

FIG. 1 is a plan view of a display device according to the present embodiment. FIG. 2 is a rear view of a light guiding device viewed from an observer side. FIG. 3 is a view illustrating a light path of image light in the light guiding device. FIG. 1 corresponds to a cross section I-I of the light guiding device illustrated in FIG. 2. The display device according to the present embodiment is used as, for example, a head-mounted display.

Hereinafter, an XYZ coordinate system is used in the drawing. The X direction corresponds to a front-rear direction of an observer wearing the display device, the Y direction corresponds to a left-right direction of the observer, and the Z direction is orthogonal to the X direction and the Y direction and corresponds to an up-down direction of the observer. In the present embodiment, a −Y direction may be referred to as a left direction (left side), a +Y direction may be referred to as a right direction (right side), a +X direction may be referred to as a front direction (forward or front side), and a −X direction may be referred to as a rear direction (backward or rear side).

Overall Configuration of Light Guiding Device and Display Device

As illustrated in FIG. 1, the display device 100 includes an image forming device 10 and a light guiding device 20. FIG. 1 corresponds to a cross section I-I of the light guiding device 20 illustrated in FIG. 2.

The display device 100 allows the observer to view an image formed by the image forming device 10 as a virtual image and allows an observer to observe an external image in a see-through type. The display device 100 includes the image forming device 10 and the light guiding device 20 which are provided by one pair in correspondence with the right eye and the left eye of the observer. A device for the right eye and a device for the left eye are bilaterally symmetrical in disposition and configurations thereof are the same. Accordingly, only the device for the left eye is illustrated, and illustration of the device for the right eye is omitted here. The display device 100 has an appearance like, for example, eyeglasses as a whole.

The image forming device 10 includes a liquid crystal display device 11 and a projection lens 12. In the present embodiment, the liquid crystal display device 11 includes a backlight 11d, a liquid crystal panel 11a, an incidence side polarizer 11b provided on a light incidence side of the liquid crystal panel 11a, and an emission side polarizer 11c provided on a light emission side of the liquid crystal panel 11a.

The backlight 11d is, for example, a light source that emits white light. The liquid crystal panel 11a includes a liquid crystal layer interposed between a pair of transparent substrates. The liquid crystal panel 11a includes a plurality of pixels to which color filters are provided. The incidence side polarizer 11b and the emission side polarizer 11c are arranged so as to be in, for example, a crossed Nichol arrangement (transmission axes form an angle of 90° with each other).

Each pixel of the liquid crystal panel 11a selectively transmits light of the backlight 11d, based on the configuration, and thereby the liquid crystal display device 11 forms predetermined image light GL. The image light GL transmitted through the emission side polarizer 11c and emitted is linearly polarized light.

The projection lens 12 is a collimator lens which converts the image light GL emitted from each pixel on the liquid crystal panel 11a into substantially parallel rays. The projection lens 12 is formed of glass or plastic, and is not limited to one piece, and may be configured with a plurality of lenses. The projection lens 12 is not limited to a spherical lens, and an aspherical lens, a freeform surface lens, or the like may be used for the projection lens.

The light guiding device 20 is configured by a light transmitting member of a flat shape. While emitting the image light GL formed by the image forming device 10 toward the eye EY of an observer as virtual image light, the light guiding device 20 transmits external light (see-through light) EL which forms an external image and guides the external light to the eye EY of the observer. The light guiding device 20 includes an incidence portion 21 on which image light GL is incident, a light guiding body 22 that mainly guides the image light GL, and an emission portion 23 that emits the image light GL and the external light EL. The light guiding body 22 and the incidence portion 21 are integrally formed of a resin material with high light transmittance. In a case of the present embodiment, the light path of the image light GL propagating through the light guiding device 20 is configured with a light path of one type that reflects light in the same number of times, and may not be a combination of a plurality of types of light paths.

The light guiding body 22 is disposed to be inclined with respect to the light axis AX which uses the eye EY of the observer as a reference. A normal direction (X' direction which will be described below) of a flat surface 22a of the light guiding body 22 is inclined by an angle κ with respect to the light axis AX. Thereby, the light guiding body 22 can be disposed along a front surface of the face, and a normal line of the flat surface 22a of the light guiding body 22 is inclined with respect to the light axis AX. As such, in a case where the normal direction of the flat surface 22a of the light guiding body 22 is inclined by the angle κ with respect to the X' direction parallel to the light axis AX, the image light GL0 on and around the light axis AX which is emitted from the optical element 30 which will be described below forms an angle κ with respect to the normal direction (X' direction) of the light emission surface OS.

Figure 4:
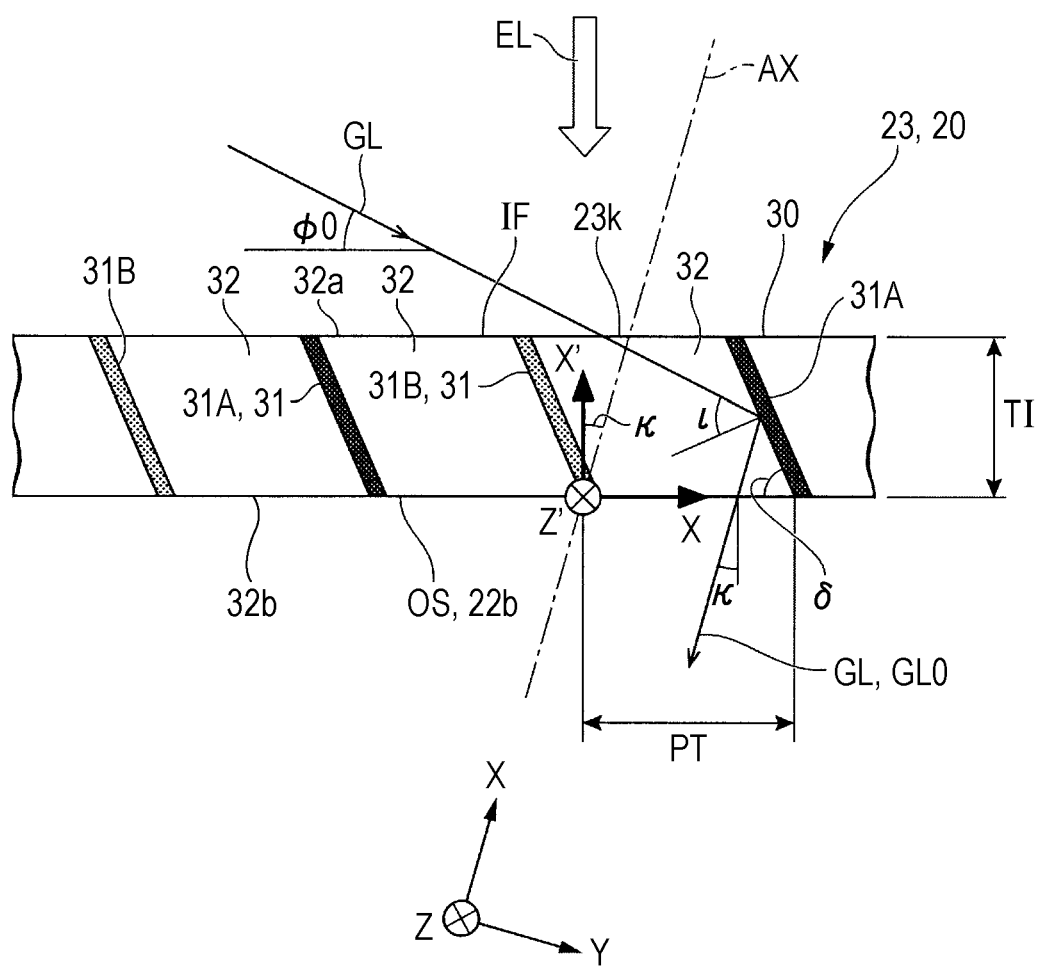
FIG. 4 is a view illustrating a configuration of an optical element.

In FIG. 3, and FIG. 4 which will be described below, another X'Y'Z' coordinate system may be used together with the XYZ coordinate system. The X' direction corresponds to the normal direction of a flat surface 22a of the light guiding body 22, the Z' direction corresponds to a vertical direction, and the Y' direction corresponds to a direction orthogonal to the X' direction and the Z' direction. The X' direction and the Y' direction of the X'Y'Z' coordinate system are axes obtained by rotating the X axis and the Y axis in the XYZ coordinate system counterclockwise around the Z axis, respectively, and the Z' direction of the X'Y'Z' coordinate system coincides with the Z direction of the XYZ coordinate system.

The incidence portion 21 includes a light incidence surface IS that makes the image light GL from the image forming device 10 incident on an inside of the incidence portion 21, a reflection surface RS that reflects the image light GL to guide to an inside of the light guiding body 22. The light incidence surface IS is formed by a curved surface 21b of concaveness on the projection lens 12 side. The curved surface 21b also has a function of totally reflecting the image light GL reflected by the reflection surface RS on the inner surface side.

The reflection surface RS is configured with a curved surface 21a of concaveness on the projection lens 12 side. The reflection surface RS is formed of a metal film such as an aluminum film formed on the curved surface 21a by an evaporation method or the like. The reflection surface RS reflects the image light GL incident from the light incidence surface IS and bends the light path.

The curved surface 21b totally reflects the image light GL reflected by the reflection surface RS into an inner side and bends a light path. As such, the incidence portion 21 reflects the image light GL incident from the light incidence surface IS twice and bends the light path, thereby, reliably guiding the image light GL to the inside of the light guiding body 22.

The light guiding body 22 is a light guiding member of a flat shape parallel to the Z axis and is inclined with respect to the Y axis. The light guiding body 22 is formed of a resin material and the like with light transmittance, and includes a pair of flat surfaces 22a and 22b substantially parallel to each other. Since the flat surfaces 22a and 22b are parallel flat surfaces, enlargement and focus shift of an external image are not made. The flat surface 22a functions as a total reflection surface that totally reflects the image light from the incidence portion 21, and guides the image light GL to the emission portion 23 with a small loss. The flat surface 22a is disposed on an external side of the light guiding body 22 and functions as a first total reflection surface.

The flat surface 22b located on an observer side extends to one end of the emission portion 23. Here, the flat surface 22b is a boundary IF between the light guiding body 22 and the emission portion 23 (refer to FIG. 3).

In the light guiding body 22, the image light GL reflected by the reflection surface RS or the light incidence surface IS of the incidence portion 21 is incident on the flat surface 22a which is a total reflection surface, is totally reflected by the flat surface 22a, and is guided to the Y' side on which a back side of the light guiding device 20, that is, the emission portion 23 is provided. As illustrated in FIG. 2, the light guiding body 22 has a vertical end surface ES as an end surface of the Y' side in an outer shape of the light guiding device 20. In addition, the light guiding body 22 has an upper end surface TP and a lower end surface BP as end surfaces on the Z side.

As illustrated in FIG. 3, the emission portion 23 is formed in a plate shape along the flat surface 22b or the boundary IF on the back side (+Y' side) of the light guiding body 22. When the image light GL totally reflected by a region FR of the flat surface (total reflection surface) 22a on the external side of the light guiding body 22 is allowed to pass through, the emission portion 23 reflects the incident image light GL at a predetermined angle and bends toward the light emission surface OS side. Here, the image light GL, which is first incident to the emission portion 23 without passing through the emission portion, is a target to be taken out as virtual image light. That is, although there is light reflected by an inner surface of the light emission surface OS in the emission portion 23, the light is not used as image light.

The emission portion 23 includes an optical element 30 in which a plurality of partially reflecting mirrors 31 with light transmittance are arranged in one direction. A structure of the optical element 30 will be described in detail below with reference to FIG. 4 and the like. The optical element 30 is provided along the flat surface 22b of the light guiding body 22 on the observer side.

Since the light guiding device 20 has the aforementioned structure, as illustrated in FIG. 3, a light path of the image light GL emitted from the image forming device 10 and incident on the light guiding device 20 from the light incidence surface IS is bent by multiple reflections caused by the incidence portion 21, and the image light is totally reflected in the region FR of the flat surface 22a of the light guiding body 22 and proceeds substantially along the light axis AX. The image light GL reflected by the region FR of the flat surface 22a on the +X side is incident on the emission portion 23.

At this time, a width of the region FR in the longitudinal direction is narrower than a width of the emission portion 23 in the longitudinal direction, in an YZ plane. That is, an incidence width in which a light ray flux of rays of the image light GL is incident on the emission portion 23 (or the optical element 30) is wider than an incidence width in which a light ray flux of the image light GL is incident on the region FR. As such, by relatively narrowing the incidence width in which a light ray flux of the image light GL is incident on the region FR, interference of the light path is less likely to occur, and the boundary IF is not used for guiding, that is, it is easy for the image light GL from the region FR to be directly incident on the emission portion 23 (or the optical element 30) without reflecting the image light GL at the boundary IF.

As the image light GL incident on the emission portion 23 is bent at an appropriate angle in the emission portion 23, the image light can be taken out, and is finally emitted from the light emission surface OS. The image light GL emitted from the light emission surface OS is incident on the eye EY of an observer as virtual image light. As the virtual image light forms an image on the retina of the observer, the observer can view the virtual image formed by the image light GL.

Here, an angle in which the image light GL used for image formation is incident on the emission portion 23 increases as the image light moves apart from the incidence portion 21 on the light source side. That is, the image light GL which is largely inclined with respect to the flat surface 22b on an observer side is incident on the back side (+Y' side) of the emission portion 23 and is bent at a relatively large angle, and the image light GL which is slightly inclined with respect to the flat surface 22b is incident on a front side (−Y' side) of the emission portion 23 and is bent at a relatively small angle.

Light Path of Image Light

Hereinafter, the light path of the image light GL will be described in detail.

As illustrated in FIG. 3, components emitted from a central portion denoted by a dashed line, in the image light respectively emitted from the liquid crystal panel 11a, is defined as image light GL0, and components emitted from the left side (−Y side) of a paper surface, in the periphery of the liquid crystal panel 11a denoted by an alternate long and short dash line, is defined as image light GL1, and components emitted from the right side (+Y side) of the paper surface, in the periphery of the liquid crystal panel 11a denoted by a two point chain line, is defined as image light GL2. The light path of the image light GL0 among those is assumed to extend along the light axis AX.

The image lights GL0, GL1, and GL2 that pass through the projection lens 12 are respectively incident from the light incidence surface IS of the light guiding device 20, and then proceeds to the emission portion 23 by passing through the inside of the light guiding body 22 via the incidence portion 21. Specifically, the image light GL0 emitted from the central portion of the liquid crystal panel 11a among the image lights GL0, GL1, and GL2 is bent by the incidence portion 21 and is coupled in the light guiding body 22, and then, is incident on the region FR of the one flat surface 22a at a standard reflection angle $\theta 0$ and is totally reflected, passes through the boundary IF without being reflected by the boundary IF between the light guiding body 22 and the emission portion 23 (or the optical element 30), and is directly incident on the central portion 23k of the emission portion 23. The image light GL0 is reflected at a predetermined angle in the portion 23k and is emitted as parallel light flux in a direction (direction of an angle κ with respect to the X' direction) of the light axis AX inclined with respect to the Y'Z' plane including the light emission surface OS from the light emission surface OS.

The image light GL1 emitted from one end side (−Y side) of the liquid crystal panel 11a is bent by the incidence portion 21 and is coupled in the light guiding body 22, and then, is incident on the region FR of the flat surface 22a at a maximum reflection angle $\theta 1$ and is totally reflected, passes through the boundary IF without being reflected by the boundary IF between the light guiding body 22 and the emission portion 23 (or the optical element 30), is reflected at a predetermined angle in the portion 23h of the back side (+Y' side), in the emission portion 23, and is emitted as a parallel light flux from the light emission surface OS at a predetermined angle direction. At this time, in an emission angle γ1, an angle returning to the incidence portion 21 side is relatively large.

Meanwhile, the image light GL2 emitted from the other end side (+Y side) of the liquid crystal panel 11a is bent by the incidence portion 21 and coupled in the light guiding body 22, and then, is incident on the region FR of the flat surface 22a at a minimum reflection angle $\theta 2$ and is totally reflected, passes through the boundary IF without being reflected by the boundary IF between the light guiding body 22 and the emission portion 23 (or the optical element 30), is reflected at a predetermined angle in a portion 23m of an entrance side (−Y' side) in the emission portion 23, and is emitted as a parallel light flux from the light emission surface OS in a predetermined angular direction. At this time, in an emission angle γ2, an angle returning to the incidence portion 21 side is relatively small.

Although the image lights GL0, GL1, and GL2 are described as representative of a part of the overall rays of the image light GL, but light components configuring the other image light GL are also guided in the same manner as the image light GL0 and the like, and are emitted from the light emission surface OS. Accordingly, illustration and description of these will be omitted.

Here, a value of a critical angle θc is θc≈45.6° on the assumption that n=1.4 as an example of a value of a refractive index n of a transparent resin material used for the incidence portion 21 and the light guiding body 22. As the minimum reflection angle $\theta 2$ among the reflection angles $\theta 0$, $\theta 1$, and $\theta 2$ of the image lights GL0, GL1, and GL2 is set to a value larger than the critical angle θc, it is possible to satisfy total reflection conditions for necessary image light.

The image light GL0 directed to the center is incident on a portion 23k of the emission portion 23 at an elevation angle $\phi 0$ (=90°−$\theta 0$). The image light GL1 directed to the periphery is incident on a portion 23h of the emission portion 23 at an elevation angle $\phi 1$ (=90°−$\theta 1$). The image light GL2 directed to the periphery is incident on the portion 23m of the emission portion 23 at an elevation angle $\phi 2$ (=90°−$\theta 2$). Here, a relationship of $\phi 2 > \phi 0 > \phi 1$ is established between the elevation angles $\phi 0$, $\phi 1$, and $\phi 2$, by reflecting a magnitude relationship of the reflection angles $\theta 0$, $\theta 1$, and $\theta 2$. That is, an incidence angle on the partially reflecting mirror 31 of the optical element 30 gradually decreases in the order of the portion 23m corresponding to the elevation angle $\phi 2$, the portion 23k corresponding to the elevation angle $\phi 0$, and the portion 23h corresponding to the elevation angle $\phi 1$. In other words, the incidence angle τ on the partially reflecting mirror 31 or the reflection angle by the partially reflecting mirror 31 decreases as the light moves apart from the incidence portion 21.

An overall behavior of the light ray flux of the image light GL reflected by the flat surface 22a on the external side of the light guiding body 22 toward the emission portion 23 will be described.

As illustrated in FIG. 3, the light ray flux of the image light GL has a width being narrowed in any one of straight light paths P1 and P2 before and after being reflected by the region FR on the external side of the light guiding body 22, in an end surface including the light axis AX. Specifically, the light ray flux of the image light GL has a width being narrowed and a beam width being narrowed as a whole at a position which straddles the straight light paths P1 and P2 in the vicinity of the region FR, that is, in the vicinity of the boundary between the straight light paths P1 and P2, in the end surface including the light axis AX. Thereby, the light ray flux of the image light GL is narrowed in front of the emission portion 23, and a viewing angle in the lateral direction is widened relatively and easily.

In the described example, the width and the beam width of the image light GL are narrowed at a position which straddles the straight light paths P1 and P2, but the width and the beam width may be narrowed only on one side of the straight light paths P1 and P2.

Configuration of Optical Element

Subsequently, a configuration of the optical element 30 will be described.

FIG. 4 is a view illustrating a configuration of the optical element 30.

As illustrated in FIG. 4, the optical element 30 includes a plurality of partially reflecting mirrors 31 and a plurality of transmittance members 32. The plurality of partially reflecting mirrors 31 are provided in parallel to each other with an interval therebetween, reflect a part of the image light GL and the external light EL, and transmit the other part of the image light GL and the external light EL. The transmittance member 32 is interposed between adjacent two partially reflecting mirrors 31 of the plurality of partially reflecting mirrors 31. That is, the optical element 30 has a configuration in which the partially reflecting mirror 31 is interposed between adjacent two transmittance members 32 among the plurality of transmittance members 32. In other words, the optical element 30 has a configuration in which the partially reflecting mirrors 31 and the transmittance members 32 are alternately arranged.

The transmittance member 32 is a columnar member having a parallelogram-shaped sectional shape perpendicular to the longitudinal direction. Therefore, the transmittance member 32 has two sets of a pair of flat surfaces extending in parallel in the longitudinal direction and parallel to each other. Among one pair of flat surfaces of the two sets, one flat surface of the one set is an incidence surface 32a on which the image light GL and the external light EL are incident, the other flat surface of the one set is an emission surface 32b from which the image light GL and the external light EL emit. In addition, the partially reflecting mirror 31 is provided on one flat surface of the other set. The transmittance member 32 is formed of, for example, glass, transparent resin, or the like.

The plurality of transmittance members 32 are all configured to have the same shape and the same dimension. Accordingly, if a plurality of sets, each set is configured by a pair of the transmittance member 32 and the partially reflecting mirror 31, are bonded to each other, the plurality of partially reflecting mirrors 31 are arranged in parallel to each other as, for example, the same chip. For example, the plurality of partially reflecting mirrors 31 may be arranged in parallel to each other at variable pitches which are varied. While not illustrated in FIG. 4, an adhesive layer is provided between one surface of the partially reflecting mirror 31 and the adjacent transmittance member 32. Thereby, the optical element 30 becomes a rectangular plate-shaped member as a whole. If the optical element 30 is viewed from a normal direction of the incidence surface 32a or the emission surface 32b of the transmittance member 32, a plurality of thin band-shaped partially reflecting mirrors 31 are arranged in a stripe shape. That is, the optical element 30 has a configuration in which a plurality of rectangular partially reflecting mirrors 31 are arranged at a predetermined interval (pitch PT) in an extending direction of the light guiding body 22, that is, in the Y' direction.

The partially reflecting mirror 31 is formed of a reflection film interposed between the transmittance members 32. The reflection film is formed of, for example, a dielectric multilayer film obtained by alternately laminating a plurality of dielectric thin films with refractive indices different from each other. In the partially reflecting mirror 31, a short side thereof is provided so as to be inclined with respect to the incidence surface 32a and the emission surface 32b of the transmittance member 32. More specifically, the partially reflecting mirror 31 is inclined such that a reflection surface 31r faces the incidence portion 21 side toward an external side of the light guiding body 22. In other words, the partially reflecting mirror 31 is inclined in a direction in which an upper end (+X' side) rotates counterclockwise with respect to a X'Z' plane orthogonal to the flat surfaces 22a and 22b by using a long side (Z' direction) of the partially reflecting mirror 31 as ab axis. That is, each of the plurality of partially reflecting mirrors 31 is disposed so as to be inclined with respect to the incidence surface 32a and the emission surface 32b.

Hereinafter, an angle formed by the reflection surface 31r of the partially reflecting mirror 31 and the emission surface 32b of the transmittance member 32 is defined as an inclination angle δ of the partially reflecting mirror 31. In the present embodiment, the inclination angle δ of the partially reflecting mirror 31 is greater than or equal to 45° and smaller than 90°. In the present embodiment, the refractive index of the transmittance member 32 is equal to the refractive index of the light guiding body 22, but the refractive indices thereof may be different from each other. In a case where the refractive index is different, it is necessary to change the inclination angle δ of the partially reflecting mirror 31 with respect to a case where the refractive indices are equal.

In the present embodiment, the plurality of partially reflecting mirrors 31 are configured with predetermined polarized light components included in the image light GL and the external light EL, specifically, a first partially reflecting mirror 31A and a second partially reflecting mirror 31B which have different reflectances with respect to S-polarized light components and P-polarized light components.

Specifically, in the present embodiment, the plurality of partially reflecting mirrors 31 include a plurality of the first partially reflecting mirrors 31A and a plurality of the second partially reflecting mirrors 31B. In addition, the first partially reflecting mirror 31A and the second partially reflecting mirror 31B are alternately arranged in an arrangement direction (Y' direction) of the plurality of partially reflecting mirrors 31.

Figure 5:
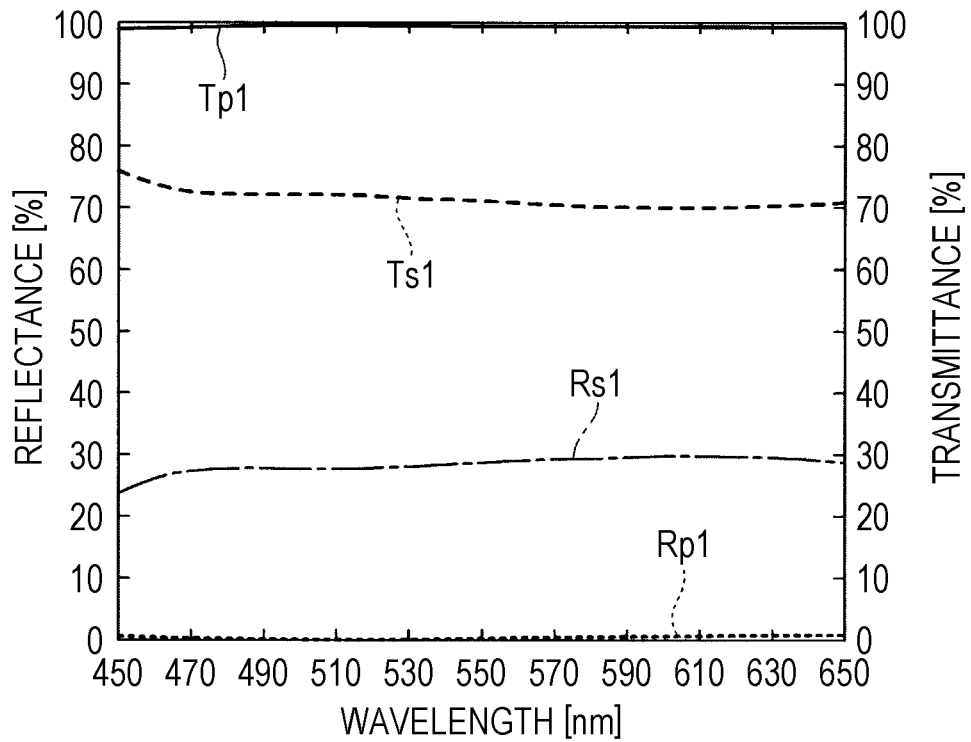
FIG. 5 is a graph illustrating reflection and transmission characteristics of a first partially reflecting mirror.

FIG. 5 is a graph illustrating reflection and transmission characteristics of the first partially reflecting mirror 31A. In FIG. 5, a horizontal axis represents a wavelength [nm], and a vertical axis represents a reflectance [%] and transmittance [%].

As illustrated in FIG. 5, in the first partially reflecting mirror 31A, a reflectance Rs1 of the S-polarized light components is in a range of approximately 25 to 30%, transmittance Ts1 of the S-polarized light components is in a range of approximately 70 to 75%, a reflectance Rp1 of the P-polarized light components is approximately 0%, and transmittance Tp1 of the P-polarized light components is approximately 100%, over the wavelength range of 450 nm to 650 nm. The first partially reflecting mirror 31A having such characteristics is configured with a dielectric multilayer film of, for example, $Al_2O_3$ having a film thickness of 176 nm, $TiO_2$ having a film thickness of 24 nm, $Al_2O_3$ having a film thickness of 56 nm, and $TiO_2$ having a film thickness of 108 nm.

Figure 6:
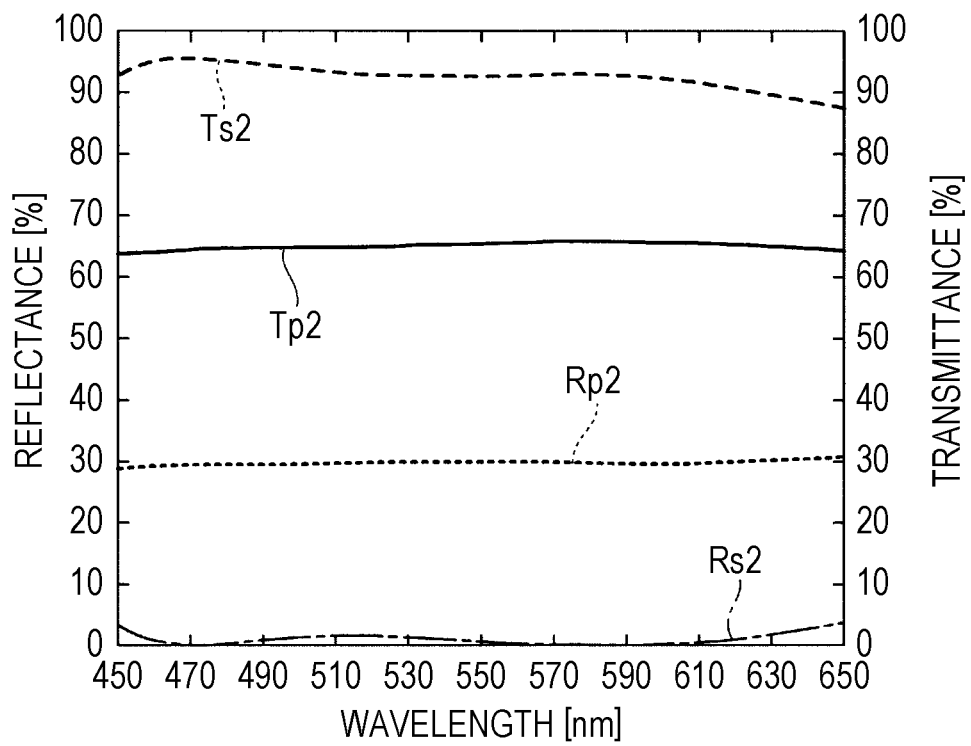
FIG. 6 is a graph illustrating reflection and transmission characteristics of a second partially reflecting mirror.

FIG. 6 is a graph illustrating the reflection and transmission characteristics of the second partially reflecting mirror 31B. In FIG. 6, a horizontal axis represents a wavelength [nm], and a vertical axis represents a reflectance [%] and transmittance [%].

As illustrated in FIG. 6, in the second partially reflecting mirror 31B, a reflectance Rs2 of the S-polarized light components is in a range of approximately 0 to 5%, transmittance Ts2 of the S-polarized light components is in a range of approximately 90 to 95%, a reflectance Rp2 of the P-polarized light components is approximately 30%, and transmittance Tp2 of the P-polarized light components is approximately 65%, over the wavelength range of 450 nm to 650 nm. The second partially reflecting mirror 31B having such characteristics is configured with, a dielectric multilayer film and a metal film of, for example, $Al_2O_3$ having a film thickness of 190 nm, $TiO_2$ having a film thickness of 48 nm, Ag having a film thickness of 15 nm, $TiO_2$ having a film thickness of 42 nm, and $Al_2O_3$ having a film thickness of 25 nm.

Here, in the first partially reflecting mirror 31A, for the sake of simple description, the reflectance Rs1 of the S-polarized light components is set to Rs1=0.3 (30%), the transmittance Ts1 of the S-polarized light components is set to Ts1=0.7 (70%), the reflectance Rp1 of the P-polarized light components is set to Rp1=0 (0%), and the transmittance Tp1 of the P-polarized light components is set to 1 (100%). In the second partially reflecting mirror 31B, the reflectance Rs2 of the S-polarized light components is Rs2=0 (0%), the transmittance Ts2 of the S-polarized light components is Ts2=1 (100%), the reflectance Rp2 of the P-polarized light components is Rp2=0.3 (30%), and the transmittance Tp2 of the P-polarized light components is Tp2=0.7 (70%).

An average value of the reflectance Rs1 of the S-polarized light components and the reflectance Rp1 of the P-polarized light components for the first partially reflecting mirror 31A is referred to as an average reflectance R1 of the first partially reflecting mirror 31A. In addition, an average value of the reflectance Rs2 of the S-polarized light components and the reflectance Rp2 of the P-polarized light components for the second partially reflecting mirror 31B is referred to as an average reflectance R2 of the second partially reflecting mirror 31B. The average reflectance R1 of the first partially reflecting mirror 31A and the average reflectance R2 of the second partially reflecting mirror 31B are both 15%.

The first partially reflecting mirror 31A has the reflectance Rs1 of the S-polarized light components higher than the average reflectance R1 (Rs1>R1) and the reflectance Rp1 of the P-polarized light components lower than the average reflectance R1 (Rp1<R1). That is, it can be said that the first partially reflecting mirror 31A has the reflectance Rs1 of the S-polarized light components relatively higher than the reflectance Rp1 of the P-polarized light components.

In addition, the second partially reflecting mirror 31B has the reflectance Rs2 of the S-polarized light components lower than the average reflectance R2 (Rs2<R2) and has the reflectance Rp2 of the P-polarized light components higher than the average reflectance R2 (Rp2>R2). That is, it can be said that the second partially reflecting mirror 31B has the reflectance Rp2 of the P-polarized light components relatively higher than the reflectance Rs2 of the S-polarized light components.

The pitch PT between the adjacent partially reflecting mirrors 31 (the first partially reflecting mirror 31A and the second partially reflecting mirror 31B) is set to approximately 0.1 mm to 2.0 mm. Strictly speaking, the pitch PT between the partially reflecting mirrors 31 is not equally spaced but is disposed at a variable pitch. More specifically, the pitch PT of the partially reflecting mirror 31 in the optical element 30 is a random pitch that randomly increases or decreases around the reference interval. As such, by arranging the partially reflecting mirrors 31 in the optical element 30 at random pitches, occurrence of diffraction unevenness and moire can be suppressed. A predetermined pitch pattern including not only the random pitch but also the pitch that increases and decreases in a plurality of stages may be repeated.

A thickness of the optical element 30, that is, a thickness TI of the partially reflecting mirror 31 in the Z-axis direction is set to, for example, approximately 0.7 mm to 3.0 mm. A thickness of the light guiding body 22 supporting the optical element 30 is, for example, approximately a few millimeters to 10 mm, preferably, approximately 4 mm to 6 mm. If the thickness of the light guiding body 22 is much larger than the thickness of the optical element 30, the incidence angle of the image light GL on the optical element 30 or the boundary IF may be easily reduced, and reflection by the partially reflecting mirror 31 at a position where the image light GL is not taken into the eye EY is easily suppressed. Meanwhile, if the thickness of the parallel light guiding body 22 is relatively thin, weights of the light guiding body 22 and the light guiding device 20 are easily reduced.

Figure 7:
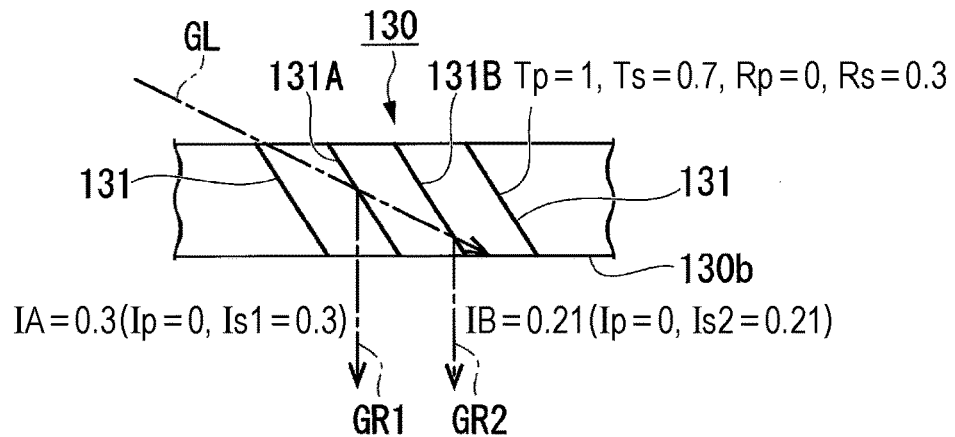
FIG. 7 is a view illustrating a first operation of an optical element in the related art.

FIG. 7 is a view illustrating the first operation of the optical element 130 in the related art.

As illustrated in FIG. 7, in the optical element 130, reflection characteristics of a plurality of partially reflecting mirrors 131 are the same over all the partially reflecting mirrors 131. The reflectance Rp of the P-polarized light components for the partially reflecting mirror 131 is set to Rp=0 (0%), and the reflectance Rs of the S-polarized light components is set to Rs=0.3 (30%) In addition, the transmittance Tp of the P-polarized light components for the partially reflecting mirror 131 is set to Tp=100 (100%) and the transmittance Ts of the S-polarized light components is set to Ts=0.7 (70%).

Here, a case where the image light GL is incident on the optical element 130 so as to pass through the two partially reflecting mirrors 131 is considered.

Here, the image light GL emitted from the image forming device 10 according to the present embodiment becomes linearly polarized light by transmitting through the emission side polarizer 11c. In the following description, for example, a case where the image light GL is incident as the S-polarized light components so as to pass through the first partially reflecting mirror 31A and the second partially reflecting mirror 31B is considered. In a case where the image light GL is incident as the P-polarized light components, reflection does not occur in the first partially reflecting mirror 31A and the second partially reflecting mirror 31B, and thereby, a case where the image light GL is the P-polarized light components is not considered.

The partially reflecting mirror 131 on which the image light GL is first incident is referred to as a first partially reflecting mirror 131A, and the partially reflecting mirror 131 on which the image light GL passing through the first partially reflecting mirror 131A is next incident is referred to as a second partially reflecting mirror 131B. Intensity of the image light GR1 reflected by the first partially reflecting mirror 131A and guided to the eye of an observer is referred to as IA, and intensity of the image light GR2 reflected by the second partially reflecting mirror 131B and guided to the eye of the observer is referred to as IB. Hereinafter, the image light GL reflected by the respective partially reflecting mirrors 131 and guided to the eyes of the observer is referred to as reflected light from the respective partially reflecting mirrors 131.

When the intensity of the original image light GL is set to 1, the intensity IA of the image light GR1 which is the reflected light from the first partially reflecting mirror 131A becomes the intensity Is1 of the S-polarized light components which are reflected by the first partially reflecting mirror 131A, and is represented by IA=Is1=0.3. Since the P-polarized light components are not reflected by the first partially reflecting mirror 131A, the intensity Ip of the P-polarized light components reflected by the first partially reflecting mirror 131A becomes 0.

The intensity IB of the image light GR2 which is the reflected light from the second partially reflecting mirror 131B becomes the intensity Is2 of the S-polarized light components which are reflected by the second partially reflecting mirror 131B after passing through the first partially reflecting mirror 131A, and is represented by IB=Is2=Ts×Rs=0.7×0.3=0.21. Since the P-polarized light components are not reflected by the second partially reflecting mirror 131B, the intensity Ip of the P-polarized light components reflected by the second partially reflecting mirror 131B becomes 0.

From the above, an intensity difference d between the reflected lights from the adjacent two partially reflecting mirrors is d=|IA−IB|=0.09.

As such, in the optical element 130 in the related art, the reflected light from the first partially reflecting mirror 131A and the reflected light from the second partially reflecting mirror 131B have different intensities from each other. Accordingly, the optical element 130 in the related art has a problem that there is a difference in an intensity profile of the reflected light on the emission surface 130b and striped unevenness is viewed.

Meanwhile, in the optical element 30 according to the present embodiment, the first partially reflecting mirrors 31A and the second partially reflecting mirrors 31B are alternately arranged as described above. In addition, in the first partially reflecting mirror 31A, the reflectance Rs1 of the S-polarized light components is 0.3, the transmittance Ts1 of the S-polarized light components is 0.7, the reflectance Rp1 of the P-polarized light components is 0, and the transmittance Tp1 of the P-polarized light components is 1. In the second partially reflecting mirror 31B, the reflectance Rs2 of the S-polarized light components is 0, the transmittance Ts2 of the S-polarized light components is 1, the reflectance Rp2 of the P-polarized light components is 0.3, and the transmittance Tp2 of the P-polarized light components is 0.7.

Since the image light GL is linearly polarized light as described above, the image light GL may be incident on the first partially reflecting mirror 31A and the second partially reflecting mirror 31B as lights of the S-polarized light components or the P-polarized light components.

For example, a case where the image light GL is incident on the first partially reflecting mirror 31A and the second partially reflecting mirror 31B as the light of the S-polarized light components is considered. In this case, the intensity IA of the reflected light from the first partially reflecting mirror 31A becomes the intensity Is1 of the S-polarized light components reflected by the first partially reflecting mirror 31A, and is represented by IA=Is1=0.3. In addition, the intensity IB of the reflected light from the second partially reflecting mirror 31B becomes the intensity Is2 of the S-polarized light components reflected by the second partially reflecting mirror 31B after passing through the first partially reflecting mirror 31A, and is represented by IB=Is2=0. Accordingly, the intensity difference d is made between the reflected lights from the respective partially reflecting mirrors 31A and 31B becomes d=|IA−IB|=0.3.

In the same manner, a case where the image light GL is incident on the first partially reflecting mirror 31A and the second partially reflecting mirror 31B as the light of the P-polarized light components. In this case, since the entire image light GL transmits through the first partially reflecting mirror 31A, the intensity IA of the reflected light from the first partially reflecting mirror 31A is represented as 0 when the intensity of the image light GL is 1. In addition, the intensity IB of the reflected light from the second partially reflecting mirror 31B becomes the intensity Is2 of the S-polarized light components reflected by the second partially reflecting mirror 31B after passing through the first partially reflecting mirror 31A and is represented by IB=Is2=0.3. That is, the intensity difference d is made between the reflected lights from the respective partially reflecting mirrors 31A and 31B becomes d=|IA−IB|=0.3.

As described above, if the image light GL is incident on the two adjacent mirrors of the first partially reflecting mirrors 31A and the second partially reflecting mirrors 31B as linearly polarized light (P-polarized light or S-polarized light), a difference occurs between the intensity of the reflected light from the first partially reflecting mirror 31A and the intensity of the reflected light from the second partially reflecting mirror 31B.

If the intensity difference occurs between the reflected light from the first partially reflecting mirror 31A and the reflected light from the second partially reflecting mirror 31B, there is a difference in an intensity profile of the reflected light on the emission surface 32b, and striped unevenness is viewed.

Therefore, the image forming device 10 according to the present embodiment emits the image light GL to the partially reflecting mirror 31 as light of a polarized state including the S-polarized light components and the P-polarized light components. Specifically, the image forming device 10 according to the present embodiment sets a direction of a transmission axis of the emission side polarizer 11c such that a direction of a polarization plane of the image light GL incident on the partially reflecting mirror 31 (the first partially reflecting mirror 31A and the second partially reflecting mirror 31B) differs from both directions of the S-polarization plane and the P-polarization plane with respect to the partially reflecting mirror 31.

Figure 8:
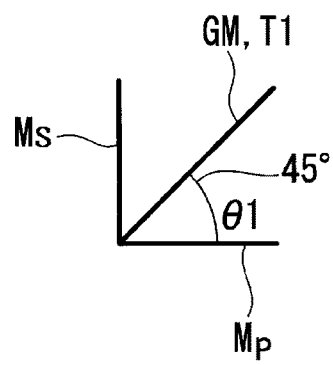
FIG. 8 is a diagram illustrating a direction of a polarization plane of image light.

FIG. 8 is a diagram illustrating the direction of the polarization plane of the image light GL. FIG. 8 illustrates the direction of the polarization plane of the image light GL emitted from the image forming device 10. As illustrated in FIG. 8, a polarization plane Mp of P-polarized light with respect to the partially reflecting mirror 31 (hereinafter, also referred to as a P-polarization plane Mp) and a polarization plane Ms of S-polarized light with respect to the partially reflecting mirror 31 (hereinafter, also referred to as a S-polarization plane Ms) are orthogonal to each other.

In the optical element 30 according to the present embodiment, the reflectance Rs1 (0.3) of the S-polarized light components in the first partially reflecting mirror 31A is equal to the reflectance Rp2 (0.3) of the P-polarized light components in the second partially reflecting mirror 31B.

In the optical element 30, in order to equalize intensity of the light (S-polarized light components) reflected by the first partially reflecting mirror 31A with intensity of the light (P-polarized light components) reflected by the second partially reflecting mirror 31B, the image light GL may be incident on the partially reflecting mirror 31 as light which includes the P-polarized light components and the S-polarized light components at the same ratio.

Specifically, in order to generate the image light GL including the P-polarized light components and the S-polarized light components at the same ratio, the polarization plane of the image light GL may be formed between the P-polarization plane Mp and the S-polarization plane Ms with respect to the partially reflecting mirror 31. That is, as illustrated in FIG. 8, in the image forming device 10, a direction of a transmission axis of the emission side polarizer 11c is set such that an angle θ1 between a polarization plane GM of the image light GL transmitted through the emission side polarizer 11c and the P-polarization plane Mp or the S-polarization plane Ms is 45°. A direction of a transmission axis T1 of the emission side polarizer 11c is the same as the direction of the polarization plane GM of the image light GL transmitted through the emission side polarizer 11c.

In a case where the direction of the transmission axis T1 of the emission side polarizer 11c is adjusted, the liquid crystal panel 11a and the incidence side polarizer 11b are rotated around the light axis AX together with the emission side polarizer 11c. Thereby, while an alignment direction of the liquid crystal panel 11a and a positional relationship between a transmission axis of the incidence side polarizer 11b, and a transmission axis of the emission side polarizer 11c are maintained, the direction of the polarization plane of the image light GL incident on the partially reflecting mirror 31 can be adjusted.

According to the image forming device 10 of the present embodiment, the image light GL of a polarized state including the P-polarized light components and the S-polarized light components for the partially reflecting mirror 31 at the same ratio can be incident on the first partially reflecting mirror 31A and the second partially reflecting mirror 31B, based on the above-described configuration.

Figure 9:
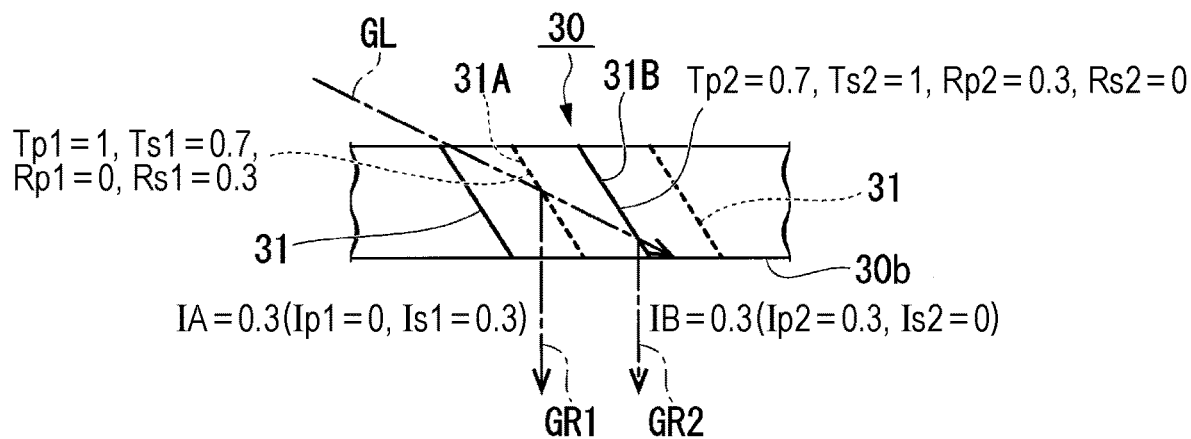
FIG. 9 is a view illustrating a first operation of an optical element according to a first embodiment.

FIG. 9 is a view illustrating a first operation of the optical element 30.

Here, if intensities of the S-polarized light components and the P-polarized light component included in the original image light GL is each set to 1, the intensity IA of the reflected light from the first partially reflecting mirror 31A is the sum of the intensity Ip1 of the P-polarized light components and the intensity Is1 of the S-polarized light components which are reflected by the first partially reflecting mirror 31A, and is represented by IA=Ip1+Is1=0+0.3=0.3, as illustrated in FIG. 9.

The intensity IB of the reflected light from the second partially reflecting mirror 31B is the sum of the intensity Ip2 of the P-polarized light components and the intensity Is2 of the S-polarized light components which are reflected by the second partially reflecting mirror 31B after passing through the first partially reflecting mirror 31A, and is represented by IB=Ip2+Is2=0.3+0=0.3.

That is, the intensity difference d between the reflected lights from the respective partially reflecting mirrors 31A and 31B is d=|IA−IB|=0. As such, according to the optical element 30 of the present embodiment, the intensity of the reflected light from the first partially reflecting mirror 31A and the intensity of the reflected light from the second partially reflecting mirror 31B can be equalized with each other. Thus, since there is no difference in an intensity profile of the reflected light emitted from the emission surface 32b, it is difficult for striped unevenness to be viewed. Thus, the observer can view a high uniform image without unevenness.

Subsequently, a second operation and effects of the optical element 30 according to the present embodiment will be described. First, prior to describing the optical element 30 according to the present embodiment, an optical element 130 of related art will be described as a comparison.

Figure 10:
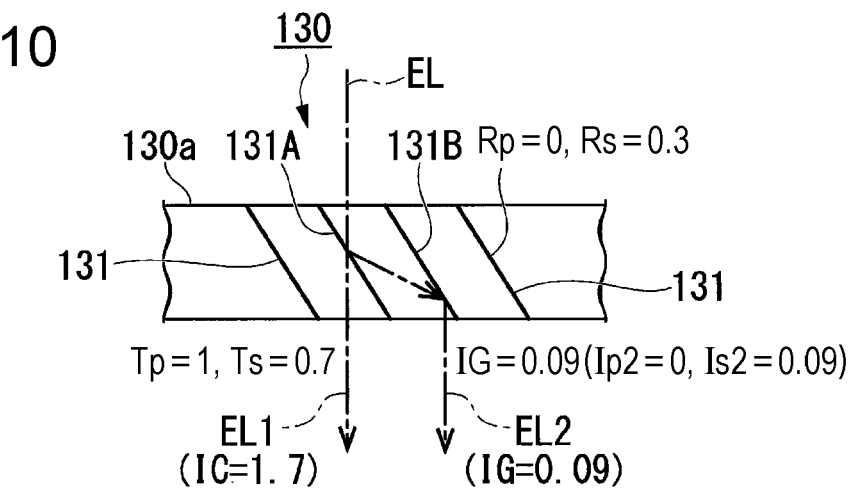
FIG. 10 is a view illustrating a second operation of the optical element in the related art.

FIG. 10 is a view illustrating the second operation of the optical element 130 in the related art.

As illustrated in FIG. 10, in the optical element 130 in the related art, the reflection characteristics of the plurality of a partially reflecting mirror 131 are the same over all the partially reflecting mirror 131. The reflectance Rp of the P-polarized light components for the partially reflecting mirror 131 is set to Rp=0 (0%), and the reflectance Rs of the S-polarized light components is set to Rs=0.3 (30%). In addition, the transmittance Tp of the P-polarized light components for the partially reflecting mirror 131 is set to Tp=1 (100%), and the transmittance Ts of the S-polarized light components is set to Ts=0.7 (70%).

Here, a case where the external light EL is perpendicularly incident on the incidence surface 130a of the optical element 130 is considered. The partially reflecting mirror 131 on which the external light EL is first incident is referred to as a first partially reflecting mirror 131A and the partially reflecting mirror 131 on which the external light EL reflected by the first partially reflecting mirror 131A is next incident is referred to as a second partially reflecting mirror 131B. Intensity of the transmitted light EL1 that passes through the first partially reflecting mirror 131A and is guided to the eye of an observer is referred to as $I_C$, and intensity of the reflected light EL2 that is reflected by the first partially reflecting mirror 131A, is reflected again by the second partially reflecting mirror 131B, and is guided to the eye of the observer is referred to as IG. Since being non-polarized light, the external light EL contains the P-polarized light components and the S-polarized light components for the partially reflecting mirror 131.

When intensity of the original external light EL is set to 1, the intensity $I_C$ of the transmitted light EL1 from the first partially reflecting mirror 131A is the sum of the intensity Ip1 of the P-polarized light components passing through the first partially reflecting mirror 131A and the intensity Is1 of the S-polarized light components, and is represented by $I_C$=Ip1+Is1=Tp+Ts=1+0.7=1.7.

In contrast to this, the intensity IG of the reflected light EL2 from the second partially reflecting mirror 131B is the sum of the intensity Ip2 of the P-polarized light components reflected by the second partially reflecting mirror 131B after being reflected by the first partially reflecting mirror 131A and the intensity Is2 of the S-polarized light components, and is represented by IG=Ip2+Is2=Rp×Rp+Rs×Rs=0×0+0.3×0.3=0.09. In this case, since the reflected light is emitted from the second partially reflecting mirror 131B adjacent to the first partially reflecting mirror 131A, a phenomenon (ghost) appears in which an external image is dually viewed. Here, if a value of $I_G/I_C$ is defined as ghost contrast C, C=0.09/1.7=0.053.

In contrast to this, in the optical element 30 according to the present embodiment, as described above, the first partially reflecting mirrors 31A and the second partially reflecting mirrors 31B are alternately arranged. In addition, for example, in the first partially reflecting mirror 31A, the reflectance Rs1 of the S-polarized light components is set to 0.3, the transmittance Ts1 of the S-polarized light components is set to 0.7, the reflectance Rp1 of the P-polarized light components is set to 0, and the transmittance Tp1 of the P-polarized light components is set to 1. In the second partially reflecting mirror 31B, the reflectance Rs2 of the S-polarized light components is set to 0, the transmittance Ts2 of the S-polarized light components is set to 1, the reflectance Rp2 of the P-polarized light components is set to 0.3, and the transmission Tp2 of the P-polarized light components is set to 0.7.

Figure 11:
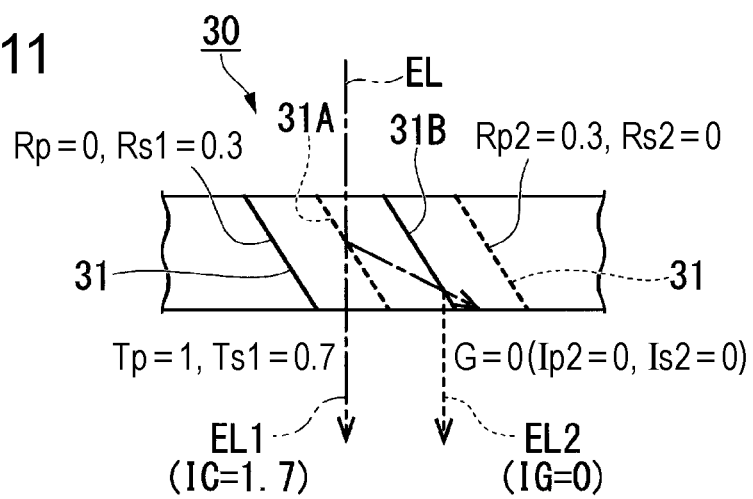
FIG. 11 is a view illustrating a second operation of the optical element according to the first embodiment.

FIG. 11 is a view illustrating the second operation of the optical element 30 according to the present embodiment.

As illustrated in FIG. 11, when the intensity of the original external light EL is set to 1, the intensity $I_C$ of the transmitted light EL1 from the first partially reflecting mirror 31A is the sum of the intensity Ip1 of the P-polarized light components passing through the first partially reflecting mirror 31A and the intensity Is1 of the S-polarized light components, and is represented by $I_C$=Ip1+Is1=Tp1+Ts1=1+0.7=1.7. In addition, the intensity $I_G$ of the reflected light from the second partially reflecting mirror 31B is the sum of the intensity Ip2 of the P-polarized light components reflected by the second partially reflecting mirror 31B after being reflected by the first partially reflecting mirror 31A and the intensity Is2 of the S-polarized light components, and is represented by $I_G = Ip2 + Is2 = Rp1 \times Rp2 + Rs1 \times Rs2 = 0 \times 0.3 + 0.3 \times 0 = 0$. That is, there is no light that is reflected by the first partially reflecting mirror 31A and thereafter, is reflected by the second partially reflecting mirror 31B, and then, is guided to the eye of an observer.

As such, in the optical element 30 according to the present embodiment, it is possible to suppress that a part of the external light EL incident on one partially reflecting mirror 31 is reflected and is emitted from the adjacent partially reflecting mirror 31, and thus, there is little possibility that ghost of the external image is viewed.

First Modification Example

In the description of the first embodiment, a case where the reflectance Rs1 of the S-polarized light components and the reflectance Rp2 of the P-polarized light components in the partially reflecting mirror 31 (the first partially reflecting mirror 31A and the second partially reflecting mirror 31B) are equal to each other as the optical element 30 is described as an example, and the reflectance Rs1 and the reflectance Rp2 may be different from each other.

For example, an optical element having the reflectance Rs1 of the first partially reflecting mirror 31A smaller than the reflectance Rp2 of the second partially reflecting mirror 31B may be used as the optical element 30. In a case where the optical element 30 is used, the image light GL including the S-polarized light components more than the P-polarized light components may be generated so as to equalize the intensity of the light (S-polarized light components) reflected by the first partially reflecting mirror 31A with the intensity of the light (P-polarized light components) reflected by the second partially reflecting mirror 31B.

Here, if an angle between the polarization plane of the image light GL and the P-polarization plane Mp with respect to the partially reflecting mirror 31 is referred to as θ1 (refer to FIG. 8), a ratio between the amount of light of the S-polarized light components and the amount of light of the P-polarized light components in the image light GL becomes $\sin^2\theta1 : \cos^2\theta1$. Thus, in the optical element 30, by setting a direction of the transmission axis T1 of the emission side polarizer 11c such that the angle θ1 formed between the polarization plane GM of the image light GL and the P-polarization plane Mp is larger than 45°, the image light GL including the S-polarized light components relatively more than the P-polarized light components can be generated.

According to the image light GL, the amount of incident light of the P-polarized light components for the second partially reflecting mirror 31B having a relatively high reflectance can be suppressed, while the amount of incident light of the S-polarized light components for the first partially reflecting mirror 31A having a relatively low reflectance is increased. Accordingly, the intensity of light (S-polarized light components) reflected by the first partially reflecting mirror 31A can be equalized to the intensity of the light (P-polarized light components) reflected by the second partially reflecting mirror 31B.

Alternatively, an optical element having the reflectance Rs1 of the first partially reflecting mirror 31A larger than the reflectance Rp2 of the second partially reflecting mirror 31B may be used as the optical element 30. In a case where the optical element 30 is used, the image light GL including the P-polarized light components more than the S-polarized light components may be generated so as to equalize the intensity of the light (S-polarized light components) reflected by the first partially reflecting mirror 31A with the intensity of the light (P-polarized light components) reflected by the second partially reflecting mirror 31B.

In this case, by setting a direction of the transmission axis T1 of the emission side polarizer 11c such that the angle θ1 formed between a polarization plane of the image light GL and the P-polarization plane Mp is smaller than 45° in the optical element 30, the image light GL including the P-polarized light components relatively more than the S-polarized light components is generated.

According to the image light GL, the amount of incident light of the P-polarized light components for the second partially reflecting mirror 31B having a relatively low reflectance can be suppressed, while the amount of incident light of the S-polarized light components for the first partially reflecting mirror 31A having a relatively high reflectance is deceased. Accordingly, the intensity of light (S-polarized light components) reflected by the first partially reflecting mirror 31A can be equalized to the intensity of the light (P-polarized light components) reflected by the second partially reflecting mirror 31B.

Second Embodiment

Subsequently, a display device according to a second embodiment will be described. A difference between the present embodiment and the first embodiment is a configuration of the image forming device, and other configurations are common. Accordingly, the same reference numeral or symbol is attached to a configuration common to the configuration according to the first embodiment, and detailed description thereof will be omitted.

Figure 12:
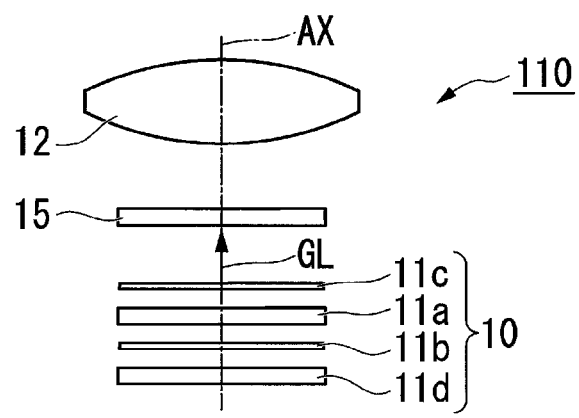
FIG. 12 is a view illustrating a configuration of an image forming device according to a second embodiment.

FIG. 12 is a view illustrating a configuration of an image forming device according to the present embodiment.

As illustrated in FIG. 12, an image forming device 110 according to the present embodiment is different from the image forming device 10 according to the first embodiment in that the image forming device 110 further includes a retardation plate 15 in addition to the configuration of the image forming device 10. A position of the retardation plate 15 may be any position between the emission side polarizer 11c and the optical element 30 in a light path of the image light GL.

In the present embodiment, the retardation plate 15 is disposed on an external side of the emission side polarizer 11c in the liquid crystal display device 11. Specifically, since angles of the emission side polarizer 11c and the retardation plate 15 need to be precisely adjusted as will be described below, it is preferable to dispose the retardation plate 15 near the emission side polarizer 11c.

Here, a case where the image forming device 10 according to the first embodiment adjusts a direction of the emission side polarizer 11c so as to rotate a polarization plane of the image light GL is described as an example, however, for the sake of convenient configuration of a device, it may be difficult to change the direction of the emission side polarizer 11c.

In contrast to this, the image forming device 110 according to the present embodiment adjusts the direction of the polarization plane of the image light GL by using the retardation plate 15. Specifically, the retardation plate 15 is formed of a half-wave plate with respect to a wavelength of the image light GL. An optical axis of the retardation plate 15 intersects a transmission axis of the emission side polarizer 11c. An optical axis of the retardation plate 5 may be either the fast axis or the slow axis of the retardation plate 5.

Figure 13:
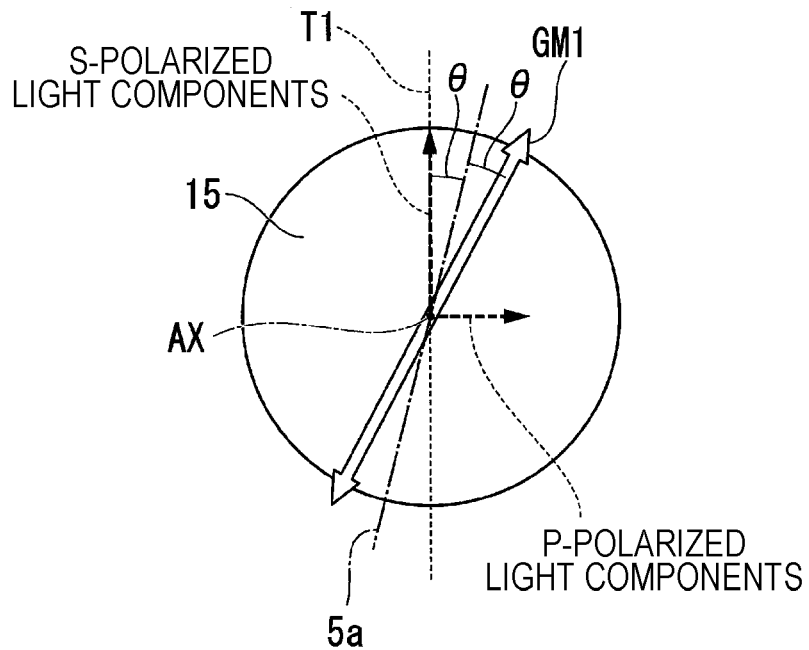
FIG. 13 is a diagram illustrating an effect obtained by a half-wave plate.

Here, effects of the retardation plate 15 will be described. FIG. 13 is a diagram of the retardation plate 15 viewed from a direction of the light axis AX. As illustrated in FIG. 13, if an angle between a slow axis 5a of the retardation plate 5 and a transmission axis T1 of the emission side polarizer 11c is θ, a polarization plane GM1 of the image light GL emitted from the retardation plate 5 rotates by 2θ with respect to a polarization plane shortly after passing through the emission side polarizer 11c.

For example, in a case where a direction of the transmission axis T1 of the emission side polarizer 11c corresponds to the S-polarized light components, if the slow axis 5a of the retardation plate 15 is disposed so as to be inclined clockwise by 22.5° with respect to the transmission axis T1 (θ=22.5°), the polarization plane GM1 of the image light GL emitted from the retardation plate 15 rotates by 45°. That is, it is possible to obtain the same effect as in a case where the emission side polarizer 11c is inclined by 45° with respect to the P-polarization plane Mp in the image forming device 10 according to the first embodiment (refer to FIG. 8).

Thus, the image forming device 110 according to the present embodiment can also obtain the same effect as the image forming device 10 according to the first embodiment. In addition, by rotating the retardation plate 15, the polarization plane of the image light GL can be easily and reliably rotated. Accordingly, there is no need to adjust the optical axis on the liquid crystal display device 11 side, and thereby, it is possible to improve assemblability of the image forming device 110.

Second Modification Example

In the description of the second embodiment, a case where a half-wave plate is used as the retardation plate 15 is described, and the invention is not limited to this.

For example, instead of the retardation plate 15 formed of a half-wave plate, a retardation plate formed of a quarter-wave plate may be used.

Hereinafter, effect of a retardation plate 115 formed of a quarter-wave plate will be described with reference to FIG. 14.

Figure 14:
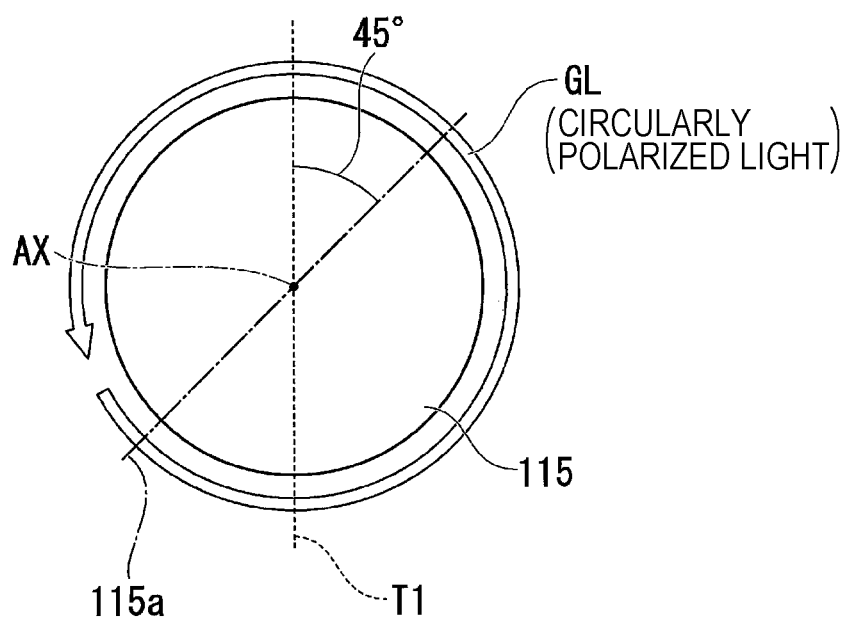
FIG. 14 is a diagram illustrating an effect obtained by a quarter-wave plate.

For example, in a case where the transmission axis T1 of the emission side polarizer 11c corresponds to the S-polarized light components, if a slow axis 115a of the retardation plate 115 is inclined to an angle of 45° with respect to the transmission axis T1 as illustrated in FIG. 14, the image light GL emitted from the retardation plate 115 is converted into circularly polarized light. The image light GL of the circularly polarized light is light of a polarized state including the P-polarized light components and the S-polarized light components at the same ratio.

Thus, even in a case where the retardation plate 115 is used as in the present modification example, it is possible to obtain the same effects as those of the image forming device 110 according to the second embodiment.

Third Modification Example

In the second embodiment and the second modification example described above, a case where the reflectance Rs1 of the S-polarized light components and the reflectance Rp2 of the P-polarized light components in the partially reflecting mirror 31 (the first partially reflecting mirror 31A and the second partially reflecting mirror 31B) are equal, and the invention is not limited to this.

An optical element having the reflectance Rs1 of the first partially reflecting mirror 31A and the reflectance Rp2 of the second partially reflecting mirror 31B which are different from each other may be used as the optical element 30.

In a case where the optical element 30 is used, in order to equalize the intensity of the light (S-polarized light components) reflected by the first partially reflecting mirror 31A and the intensity of the light (P-polarized light components) reflected by the second partially reflecting mirror 31B, the image light GL of the polarized state may be controlled so as to suppress the incidence amount of light with the polarized light components for the partially reflecting mirror 31 having a relatively high reflectance, while the incidence amount of light with the polarized light components corresponding to the partially reflecting mirror 31 having a relatively low reflectance.

For example, in the second modification example, if the angle between the slow axis 115a of the retardation plate 115 formed of the quarter-wave plate illustrating in FIG. 14 and the transmission axis T1 of the emission side polarizer 11c is adjusted to be an angle other than 45°, the image light GL can be converted into elliptically polarized light. The image light GL formed of the elliptically polarized light becomes light of a polarized state including P-polarized light components and S-polarized light components at a predetermined ratio in accordance with an elliptical shape.

As such, even in a case where the reflectance Rs1 of the first partially reflecting mirror 31A and the reflectance Rp2 of the second partially reflecting mirror 31B are different from each other, the image light GL that suppresses the incidence amount of light with polarized light components for the partially reflecting mirror 31 having a relatively high reflectance can be generated by appropriately adjusting an angle of the retardation plate 115, while the incidence amount of light with the polarized light components corresponding to the partially reflecting mirror 31 having a relatively low reflectance is increased.

Thus, it is possible to equalize the intensity of light (S-polarized light components) reflected by the first partially reflecting mirror 31A with the intensity of the light (P-polarized light components) reflected by the second partially reflecting mirror 31B.

Fourth Modification Example

In the above embodiment and modification example, a case where the backlight 11d is used as a light source of the liquid crystal panel 11a is described, and the invention is not limited to this.

Figure 15:
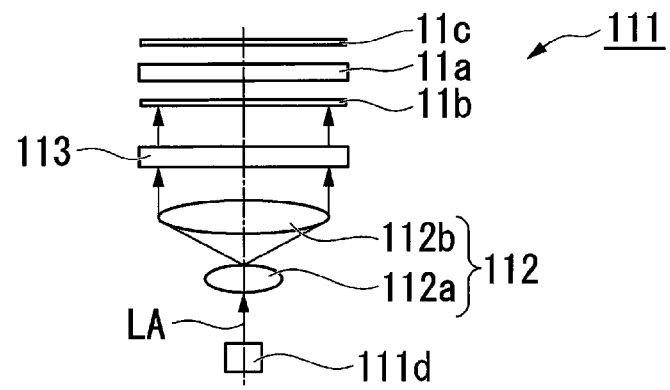
FIG. 15 is a view illustrating a schematic configuration of a liquid crystal display device according to a fourth modification example.

FIG. 15 is a view illustrating a schematic configuration of a liquid crystal display device 111 according to a fourth modification example.

As illustrated in FIG. 15, the liquid crystal display device 111 according to the present modification example includes a liquid crystal panel 11a, an incidence side polarizer 11b, an emission side polarizer 11c, a laser light source 111d, a beam diameter enlarging element 112, and a beam shaping element 113.

The laser light source 111d is configured with, for example, one laser element. A beam diameter of laser beam LA emitted from the laser light source 111d is small. Accordingly, in the present modification example, the beam diameter of the laser beam LA is enlarged by the beam diameter enlarging element 112.

The beam diameter enlarging element 112 is configured with, for example, a first lens 112a and a second lens 112b. As the laser beam LA passes through the beam diameter enlarging element 112, the beam diameter is enlarged to approximately the same size as an outer shape of the liquid crystal panel 11a.

The laser beam LA of which the beam diameter is enlarged by the beam diameter enlarging element 112 is shaped into a shape corresponding to the outer shape of the liquid crystal panel 11a by enlarging a radiation angle using the beam shaping element 113, and incident on the entire image forming region of the liquid crystal panel 11a. Thereby, a size of the image light GL can be increased, and even if a position of an eye of an observer is changed, the image light GL is easily incident on the eye. Accordingly, the observer can view a good image without lack of visual field.

For example, a configuration which uses a plurality of microlenses or a configuration configured with a fine shape such as a hologram can be exemplified as the beam shaping element 113.

Third Embodiment

Subsequently, a display device according to a third embodiment will be described. A difference between the present embodiment and the first embodiment is a configuration of an image forming device, and other configurations are common. Accordingly, the same reference numeral or symbol is attached to a configuration common to the configuration according to the first embodiment, and detailed description thereof will be omitted.

Figure 16:
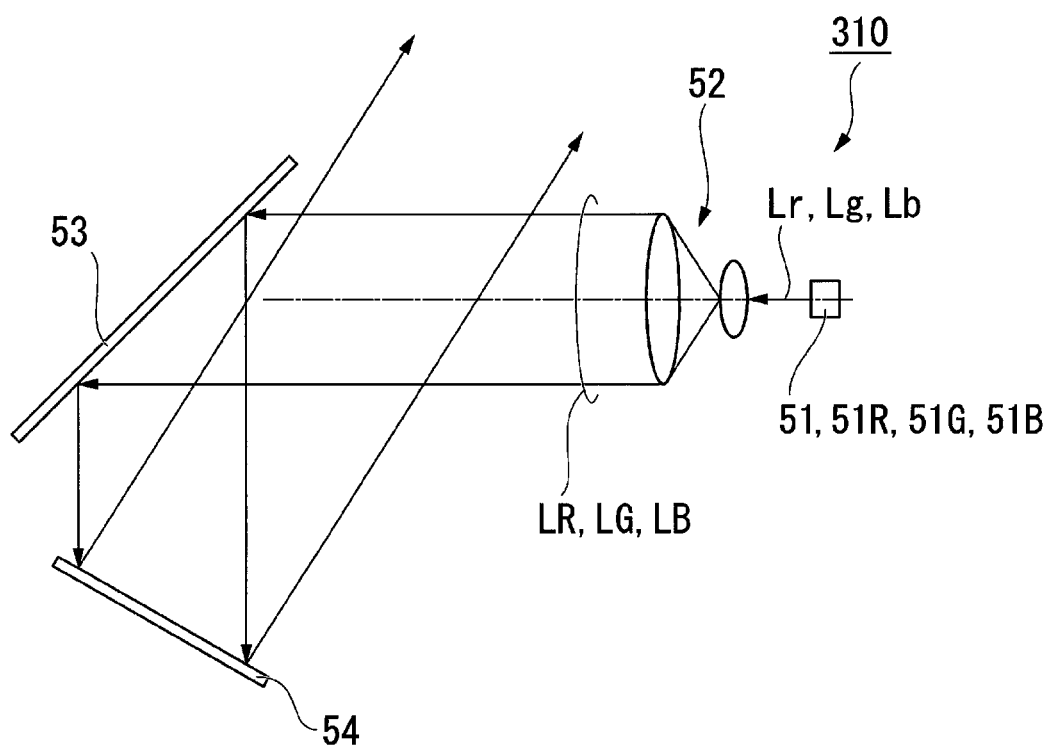
FIG. 16 is a view illustrating a configuration of an image forming device according to a third embodiment.

FIG. 16 is a view illustrating a configuration of an image forming device 310 according to the present embodiment.

As illustrated in FIG. 16, the image forming device 310 according to the present embodiment includes a laser light source 51, a pickup optical system 52, a light guide optical system 53, and a micromirror type light modulation device 54.

In the present embodiment, the laser light source 51 emits red light LR, green light LG, and blue light LB in a time division manner. The pickup optical system 52 parallelizes the light emitted from the laser light source 51 and guides the light to the light guide optical system 53.

The light guide optical system 53 is configured with a reflection mirror. The light guide optical system 53 reflects the light from the laser light source 51 so as to be incident on the micromirror type light modulation device 54 in a time division manner.

For example, a digital micromirror device (DMD) is used as the micromirror type light modulation device 54. The DMD is obtained by arranging a plurality of micromirrors (movable reflection elements) in a matrix. The DMD switches a reflection direction of light between a direction in which the light incident on the light guiding device 20 and a direction in which the light is not incident on the light guiding device 20 by switching an inclination direction of the plurality of micromirrors.

The laser light source 51 according to the present embodiment includes a first laser element 51R that emits the red light LR, a second laser element 51G that emits the green light LG, and a third laser element 51B that emits the blue light LB. The first to third laser elements 51R, 51G and 51B are mounted on a mounting substrate (not illustrated).

The micromirror type light modulation device 54 sequentially modulates the red light LR, the green light LG, and the blue light LB which are emitted from the laser light source 51, and generates red image light Lr, green image light Lg, and blue image light Lb, based on the configuration.

Meanwhile, the red light LR, the green light LG, and the blue light LB which are emitted from the laser light source 51 are linearly polarized light. Accordingly, it is necessary to locate the polarization planes of the red light LR, the green light LG and the blue light LB between the P-polarization plane and the S-polarization plane with respect to the partially reflecting mirror 31, as in the above-described embodiment.

Here, directions of the polarization planes of the red light LR, the green light LG, and the blue light LB are determined by directions of the emission surfaces of the first to third laser elements 51R, 51G, and 51B, that is, attachment directions of the first to third laser elements 51R, 51G, and 51B with respect to a mounting substrate.

Also in the present embodiment, it is assumed that the reflectance Rs1 of the S-polarized light components in the first partially reflecting mirror 31A is equal to the reflectance Rp2 of the P-polarized light components in the second partially reflecting mirror 31B in the same manner as in the above-described embodiment.

For example, in the image forming device 310 according to the present embodiment, the directions of the first to third laser elements 51R, 51G, and 51B are set such that the polarization planes (polarization directions) of the red image light Lr, the green image light Lg, and the blue image light Lb form an angle of 45° with respect to the xz plane.

By doing so, it is possible to respectively generate the red image light Lr, the green image light Lg, and the blue image light Lb which include the P-polarized light components and the S-polarized light components for the first partially reflecting mirror 31A and the second partially reflecting mirror 31B at the same ratio.

In the above description, a case where the polarization planes (polarization directions) of the red image light Lr, the green image light Lg, and the blue image light Lb rotate according to the attachment direction of the first to third laser elements 51R, 51G, and 51B is used as an example, but the polarization plane may be rotated by using a retardation plate (half-wave plate or quarter-wave plate). The retardation plate may be disposed between the laser light source 51 and the pickup optical system 52, more preferably near the laser light source 51.

Also in the present embodiment, the beam diameters of the red light LR, the green light LG, and the blue light LB may be enlarged and the radiation angle may be controlled by using the beam diameter enlarging element 112 and the beam shaping element 113 according to the fourth modification example.

Fourth Embodiment

Subsequently, a display device according to a fourth embodiment will be described. A difference between the present embodiment and the first embodiment is a configuration of an image forming device, and other configurations are common. Accordingly, the same reference numeral or symbol is attached to a configuration common to the configuration according to the first embodiment, and detailed description thereof will be omitted.

Figure 17:
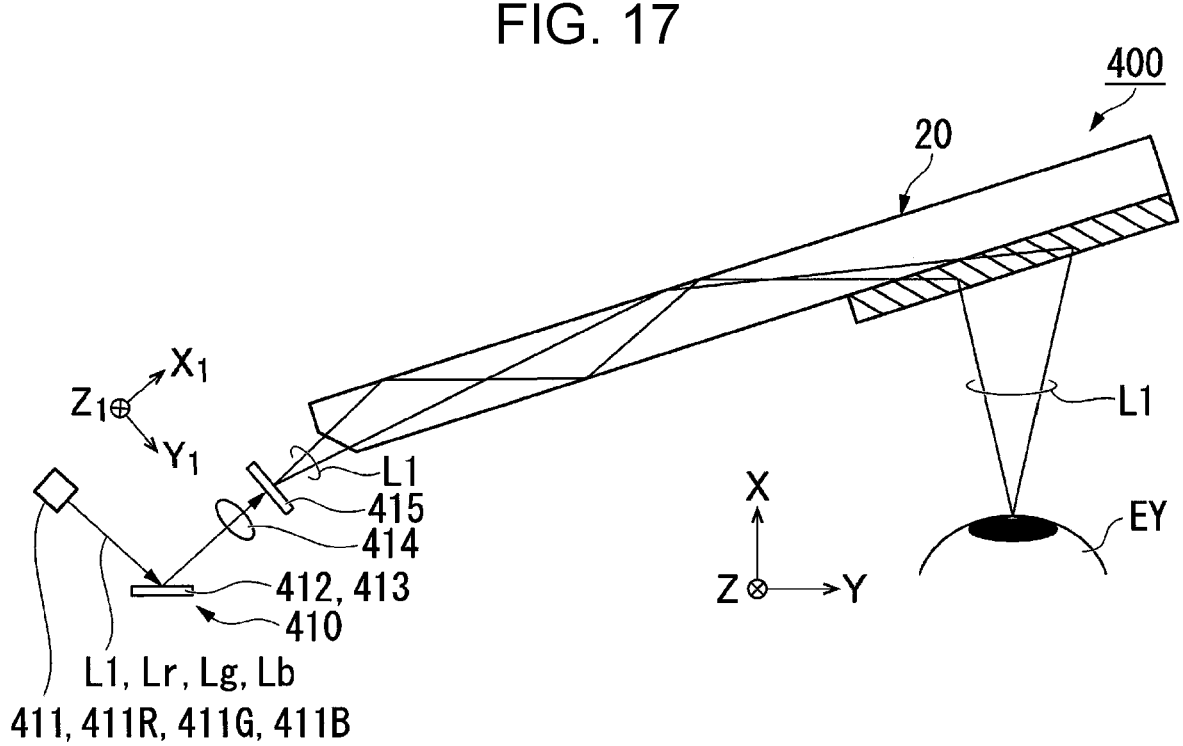
FIG. 17 is a view illustrating a schematic configuration of a display device according to a fourth embodiment.

The display device according to the present embodiment is a retina scanning type display device of a see-through type. FIG. 17 is a view illustrating a schematic configuration of a display device 400 according to the present embodiment.

As illustrated in FIG. 17, the display device 400 according to the present embodiment includes an image forming device 410 and a light guiding device 20.

The image forming device 410 includes a laser light source 411 that emits image light for displaying an image, a scan optical system 413 including a scan mirror 412 that scans image light emitted from the laser light source 411, a light guiding system 414 that causes the image light scanned by the scan optical system 413 to be incident on an eye EY of an observer, and a light ray splitting element 415. In the present embodiment, the light ray splitting element 415 corresponds to a "light ray flux enlarging element" in claims.

In the present embodiment, the laser light source 411 includes first to third laser elements 411R, 411G, and 411B that respectively emit the red image light Lr, the green image light Lg, and the blue image light Lb. The first to third laser elements 411R, 411G, and 411B are mounted on a mounting substrate (not illustrated). The scan optical system 413 can be realized by, for example, a micromirror device formed by a MEMS technology.

Hereinafter, the red image light Lr, the green image light Lg, and the blue image light Lb are collectively referred to as image light L1.

Figure 18:
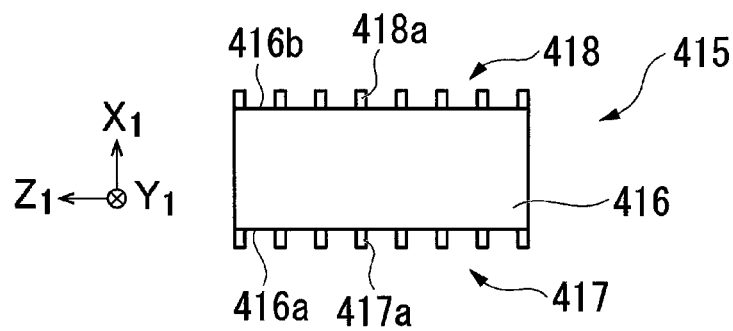
FIG. 18 is a sectional view illustrating a configuration of a light ray splitting element and a light ray diagram passing through the light ray splitting element.
Figure 19:
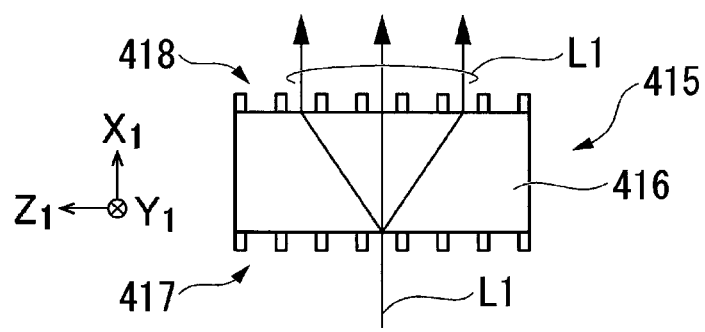
FIG. 19 is an explanatory diagram illustrating a relationship between a polarization direction and a diffraction function of light in a light ray splitting element.

The light ray splitting element 415 is for making the observer easy to see an image by splitting an image ray of the image light L1 emitted from the scan optical system 413. FIG. 18 is a sectional view schematically illustrating a configuration of the light ray splitting element 415 and a light ray diagram of light passing through the light ray splitting element 415. FIG. 19 is an explanatory diagram illustrating a relationship between a polarization direction of light and a diffraction function in the light ray splitting element 415.

As illustrated in FIG. 18, the light ray splitting element 415 according to the present embodiment includes a light-transmitting substrate 416, a first diffraction lattice 417 provided on a first surface 416a of the light-transmitting substrate 416, and a second diffraction lattice 418 provided on a second surface 416b of the light-transmitting substrate 416.

Hereinafter, description will be made by using another $X_1Y_1Z_1$ coordinate system together in FIGS. 17 to 19. The $X_1$ direction corresponds to a normal direction of a pair of surfaces (first surface 416a and second surface 416b) of the light-transmitting substrate 416, the $Z_1$ direction corresponds to a vertical direction, and the $Y_1$ direction corresponds to a direction respectively orthogonal to the $X_1$ direction and the $Z_1$ direction. As illustrated in FIG. 17, the X direction and the Y direction of the XYZ coordinate system are directions obtained by respectively rotating an $X_1$ axis and a $Y_1$ axis of the $X_1Y_1Z_1$ coordinate system counterclockwise around the $Z_1$ axis, and the Z direction of the XYZ coordinate system coincides with the $Z_1$ direction of the $X_1Y_1Z_1$ coordinate system.

The first diffraction lattice 417 has a lattice pattern configured by a plurality of convex portions 417a extending in a linear shape along the $Z_1$ direction. The second diffraction lattice 418 has a lattice pattern configured by a plurality of convex portions 418a extending in a linear shape along the $Z_1$ direction. The first diffraction lattice 417 and the second diffraction lattice 418 have the same lattice period.

Here, the diffraction efficiencies of the first diffraction lattice 417 and the second diffraction lattice 418 are different from each other depending on a oscillates direction of polarized light which is incident. Specifically, in a case where the image light L1 is incident on the first diffraction lattice 417 and the second diffraction lattice 418 as TM light that vibrates in the $Z_1$ direction, an enlargement function (diffraction functions) of a light flux diameter performed by the first diffraction lattice 417 and the second diffraction lattice 418 is not obtained sufficiently.

In contrast to this, in the present embodiment, the light emitted from the laser light source 411 (the first to third laser elements 411R, 411G, and 411B) becomes polarized light which vibrates in the Y1 direction (extending direction of convex portions 417a and 418a) when being incident on the light ray splitting element 415. That is, the image light L1 emitted from the laser light source 411 is incident on the first diffraction lattice 417 and the second diffraction lattice 418 having a lattice pattern configured by the convex portions 417a and 418a linearly extending in the $Y_1$ direction as TE light. Thus, as illustrated in FIG. 19, the image light L1 is diffracted to the first diffraction lattice 417 and the second diffraction lattice 418, and thereby, the light flux diameter in the $Z_1$ direction is favorably enlarged.

Configurations of the first diffraction lattice 417 and the second diffraction lattice 418 are not limited to the above description. For example, members having different refractive indexes may be provided or a metal wire may be embedded between the plurality of convex portions 417a and the plurality of convex portions 418a.

According to the present embodiment, the enlargement function of the light flux diameter performed by the light ray splitting element 415 can be performed by adjusting the incidence direction of the image light L1 of the light ray splitting element 415.

In addition, the image light L1 of which the light flux diameter is enlarged by the light ray splitting element 415 is polarized light that vibrates in the $Z_1$ direction. That is, it can also be said that the image light L1 is the polarized light that vibrates in the $Z_1Y_1$ plane in the $X_1Y_1Z_1$ coordinate system. The polarized light vibrating along the $X_1Y_1$ plane is P-polarized light with respect to a reflection surface 31r of the partially reflecting mirror 31.

As such, the image light L1 of which the light flux diameter is enlarged by the light ray splitting element 415 becomes linearly polarized light (P-polarized light). Accordingly, in the same manner as in the above-described embodiment, the polarization plane of the image light L1 needs to be located between the P-polarization plane and the S-polarization plane with respect to the partially reflecting mirror 31.

A direction of the polarization plane of the image light L1 can be adjusted by, for example, an attachment direction for the first to third laser elements 51R, 51G, and 51B with respect to a mounting substrate (not illustrated).

Also in the present embodiment, it is assumed that the reflectance Rs1 of the S-polarized light components of the first partially reflecting mirror 31A is equal to the reflectance Rp2 of the P-polarized light components of the second partially reflecting mirror 31 B in the same manner as in the above-described embodiment.

For example, in the image forming device 410 according to the present embodiment, the directions of the first to third laser elements 411R, 411G, and 411B are set such that an angle between the polarization plane (polarization direction) of the image light L1 and the P polarization plane Mp (refer to FIG. 8) for the partially reflecting mirror 31 is 45° As shown in Fig. By doing so, it is possible to generate the image light L1 including the P-polarized light components and the S-polarized light components for the first partially reflecting mirror 31A and the second partially reflecting mirror 31B at the same ratio.

Also in the present embodiment, the polarization plane may be rotated by disposing the retardation plate (half-wave plate or quarter-wave plate) in a rear stage of the light ray splitting element 415, instead of adjusting attachment positions of the first to third laser elements 51R, 51G, and 51B. By doing so, it is possible to change the polarized state (a ratio between the P-polarized light components and the S-polarized light components) of the image light L1 into a predetermined state by adjusting a rotation angle of the retardation plate.

Fifth Modification Example

Figure 20:
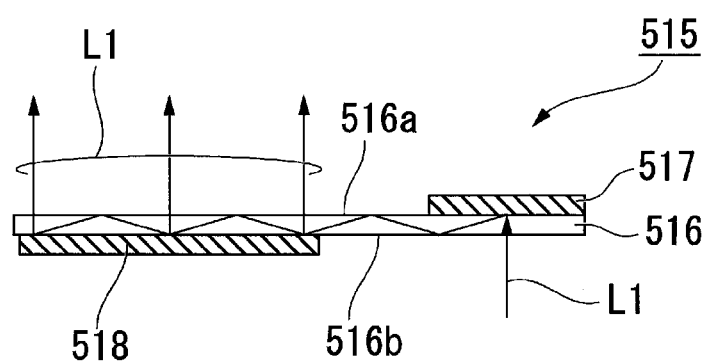
FIG. 20 is a view illustrating a configuration of a light ray splitting element according to a fifth modification example.

The configuration of the light ray splitting element 415 according to the fourth embodiment is not limited. FIG. 20 is a view illustrating a configuration according to a modification example of a light ray splitting element according to a fifth modification example. The same reference numeral or symbol is attached to a configuration common to the configuration according to the fourth embodiment, and description thereof will be omitted.

A light ray splitting element 515 illustrated in FIG. 20 includes a light guiding plate 516, a light incidence portion 517, and a light emission portion 518. The light guiding plate 516 is formed of a parallel flat plate, and in the present embodiment, the light guiding plate 516 is formed of, for example, a glass substrate.

The light incidence portion 517 is provided on one end side of an upper surface 516a of the light guiding plate 516 and makes the image light L1 incident from a lower surface 516b of the light guiding plate 516 via the light guiding system 414 (refer to FIG. 17) be incident on the light guiding plate 516. The light incidence portion 517 has a function of diffracting the image light L1 incident on the light incidence portion 517 in a long side direction of the light guiding plate 516. In the present embodiment, the light incidence portion 517 is configured with a hologram diffraction element.

The light emission portion 518 is provided on the other end side of the lower surface 516b of the light guiding plate 516 and diffracts the image light L1 taken into the light guiding plate 516 by the light incidence portion 517 to emit from the upper surface 516a of the light guiding plate 516. In the present embodiment, the light emission portion 518 is configured with a hologram diffraction element.

The image light L1 is diffracted by the light emission portion 518, thereby, being split into a plurality of rays (three in FIG. 20). Thus, also in the light ray splitting element 515 according to the present modification example, it is possible to enlarge a light flux diameter of the image light L1 in the same manner as in the light ray splitting element 415 according to the fourth embodiment.

Sixth Modification Example

Figure 21:
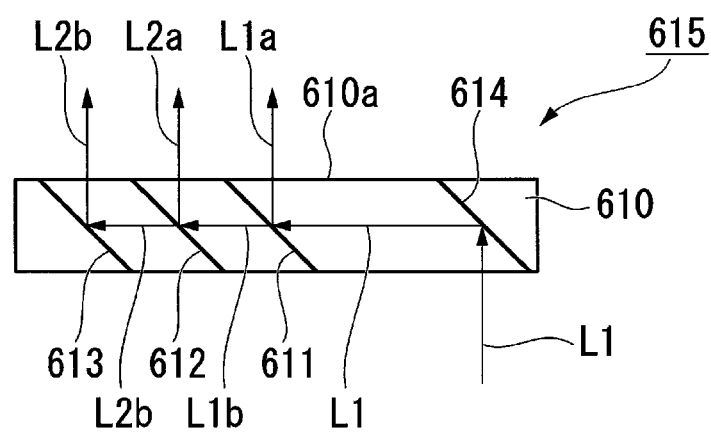
FIG. 21 is a view illustrating a configuration of a light ray splitting element according to a sixth modification example.

FIG. 21 is a view illustrating a configuration of a light ray splitting element according to a sixth modification example. The same reference numeral or symbol is attached to a configuration common to the configuration according to the fourth embodiment, and description thereof will be omitted.

A light ray splitting element 615 illustrated in FIG. 21 includes a light-transmitting member 610, a first partially reflecting mirror 611 and a second partially reflecting mirror 612, a light emission mirror 613, and a light incidence mirror 614. The first partially reflecting mirror 611, the second partially reflecting mirror 612, the light emission mirror 613, and the light incidence mirror 614 are all provided in the light-transmitting member 610.

In the present embodiment, the light-transmitting member 610 is configured with, for example, a glass substrate. The light incidence mirror 614 is provided so as to reflect the image light L1 incident from a lower surface 610b of the light-transmitting member 610 via the light guiding system 414 (refer to FIG. 17).

The first partially reflecting mirror 611 and the second partially reflecting mirror 612 are sequentially provided from a side close to the light incidence mirror 614.

The first partially reflecting mirror 611 reflects image light L1a which is a part of the image light L1 so as to be emitted from the upper surface 610a of the light-transmitting member 610 and transmits image light L1b which is the remaining part of the image light L1 so as to be incident on the second partially reflecting mirror 612.

The second partially reflecting mirror 612 reflects image light L2a which is a part of the image light L1b transmitted through the first partially reflecting mirror 611 so as to be emitted from the upper surface 610a of the light-transmitting member 610 and transmits image light L2b which is the remaining part of the image light L1b so as to be incident on the light emission mirror 613. The light emission mirror 613 reflects the image light L2b transmitted through the second partially reflecting mirror 612 so as to be emitted from the upper surface 610a of the light-transmitting member 610.

Optical characteristics (reflectance and transmittance) of the first partially reflecting mirror 611 and the second partially reflecting mirror 612 are set such that the amount of the image lights L1a, L2a, and L2b emitted from the upper surface 610a of the light-transmitting member 610 are substantially equal to each other.

The image light L1 is split into a plurality of rays (three in FIG. 21) by passing through the first partially reflecting mirror 611 and the second partially reflecting mirror 612 provided in the light-transmitting member 610. Thus, also in the light ray splitting element 615 according to the present modification example, it is possible to enlarge the light flux diameter of the image light L1 in the same manner as in the light ray splitting element 415 according to the fourth embodiment.

Fifth Embodiment

Figure 22:
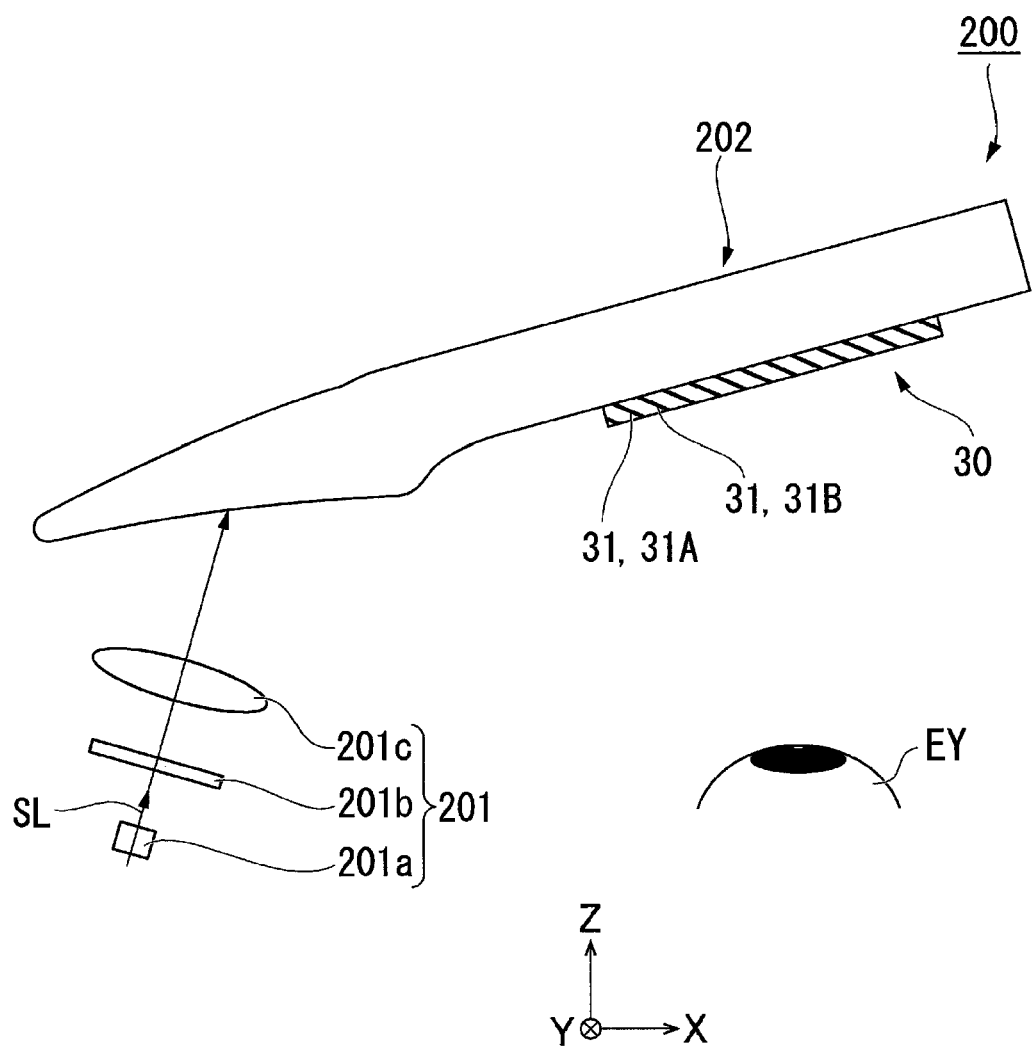
FIG. 22 is a view illustrating a schematic configuration of an illumination device according to a fifth embodiment.

Subsequently, an example of an illumination device will be described as a fifth embodiment of the invention. FIG. 22 is a view illustrating a schematic configuration of an illumination device 200. As illustrated in FIG. 22, the illumination device 200 according to the present embodiment includes a light source device 201 that emits illumination light and a light guiding device 202.

The light source device 201 includes a light source 201a that emits white illumination light SL, a retardation plate 201b on which the illumination light SL is incident, and a projection lens 201c. For example, a light source that emits the illumination light SL configured by linearly polarized light, such as a laser element is used as the light source 201a. For example, a half-wave plate is used as the retardation plate 201b. The projection lens 210c makes the illumination light SL transmitted through the retardation plate 201b be incident on the light guiding device 202 in parallel with each other.

The light source device 201 according to the present embodiment adjusts a direction of a polarization plane of the illumination light SL using the retardation plate 201b, thereby, emitting the illumination light SL as light of a polarized state including the S-polarized light components and the P-polarized light components for the partially reflecting mirror 31.

For example, in a case where the polarization plane of the illumination light SL shortly after being emitted from the light source 201*a* corresponds to the S-polarized light for the partially reflecting mirror 31, the polarization plane of the illumination light SL emitted from the retardation plate 201*b* can be rotated by 45° by inclining a slow axis of the retardation plate 201*b* by 22.5°. Thereby, it is possible to obtain the same effect as when the emission side polarizer 11*c* is inclined by 45° with respect to the xz plane, in the image forming device 10 according to the first embodiment.

Thus, according to the illumination device 200 according to the present embodiment, the intensity of the reflected light from the first partially reflecting mirror 31A can be equalized with the intensity of the reflected light from the second partially reflecting mirror 31B. Accordingly, there is no difference in an intensity profile of the illumination light SL emitted from the emission surface 32*b*, and thereby, striped unevenness can be hardly viewed. Thus, an observer can view the illumination light SL with high uniformity without unevenness.

The technical scope of the invention is not limited to the above-described embodiments, and various modifications can be made without departing from the spirit of the invention.

For example, when the optical element 30 is used in which the reflectance Rs1 of the first partially reflecting mirror 31A is equal to the reflectance Rp2 of the second partially reflecting mirror 31B, the polarized state of the image light GL may be non-polarization. That is, in a case where the optical element 30 is used in which the same reflectance Rs1 is equal to the reflectance Rp2, the image light may be incident on the optical element 30 in a state where the image light is returned to non-polarized light. For example, a crystal depolarization element using crystal can be exemplified as an element in which the image light GL is returned to non-polarized light.

Besides, a specific configuration of each part such as the number, a shape, and a material of each configuration element included in the optical element and the display device is not limited to the above-described embodiments and modification examples, and can be appropriately changed.

In addition, in the above-described embodiments, an image forming device and a light guiding device are provided as one set for each of a right eye and a left eye as the display devices 100 and 400, but the image forming device and the light guiding device may be provided only for either the right eye or the left eye, and may be applied to a configuration in which an image is monocularly viewed, that is, a monocular display device.

In addition, in the embodiments described above, a specific description is made by assuming that the display device is a head-mounted display, but the display device according to the invention can also be applied to a head-up display, a binocular type hand-held display, and the like.

The entire disclosure of Japanese Patent Application No. 2017-108816, filed May 31, 2017 is expressly incorporated by reference herein.

What is claimed is:

1. A display device comprising:
   an image forming device that emits polarized image light including S-polarized light components and P-polarized light components, the image forming device including:
   a panel unit that emits the image light; and
   an emission side polarizer that is provided on a light emission side of the panel unit;
   a light guiding body that guides the image light;
   an incidence portion that receives the image light for the light guiding body; and
   an emission portion that emits the image light from the light guiding body, the emission portion including a plurality of partially reflecting mirrors that are provided in parallel with each other with an interval therebetween and reflect a part of the image light and external light, and transmit a remainder of the image light and the external light, the plurality of partially reflecting mirrors including:
      a plurality of first partially reflecting mirrors in which reflectances of the S-polarized light components are relatively higher than reflectances of the P-polarized light components; and
      a plurality of second partially reflecting mirrors in which reflectances of the P-polarized light components are relatively higher than reflectances of the S-polarized light components,
   wherein the first partially reflecting mirrors and the second partially reflecting mirrors are alternately arranged in an arrangement direction of the plurality of partially reflecting mirrors, and
   a direction of a transmission axis of the emission side polarizer is set such that a direction of a polarization plane of the image light incident on the plurality of partially reflecting mirrors is different from both an S-polarization plane direction and a P-polarization plane direction for the plurality of partially reflecting mirrors.

2. The display device according to claim 1, wherein the image forming device includes a first retardation plate on which light that is emitted from the emission side polarizer is incident.

3. The display device according to claim 2, wherein the first retardation plate is a half-wave plate.

4. The display device according to claim 2, wherein the first retardation plate is a quarter-wave plate.

5. The display device according to claim 1,
   wherein the image forming device includes a laser light source that emits linearly polarized light as the image light, and
   the laser light source is installed such that the direction of the polarization plane of the image light incident on the plurality of partially reflecting mirrors is different from both an S-polarization plane direction and a P-polarization plane direction for the plurality of partially reflecting mirrors.

6. The display device according to claim 1, wherein the image forming device includes a laser light source that emits linearly polarized light as the image light and a second retardation plate on which the image light that is emitted from the laser light source is incident.

7. The display device according to claim 6, wherein the second retardation plate is a half-wave plate.

8. The display device according to claim 6, wherein the second retardation plate is a quarter-wave plate.

9. The display device according to claim 5,
   wherein the image forming device includes a light ray flux enlarging element that enlarges a light flux diameter of the image light, the light ray flux enlarging element is configured with a diffraction element including a lattice pattern that is configured with a plurality of convex portions extending in one direction, and the image light is incident on the light ray flux enlarging element as light that vibrates in an extending direction of the plurality of convex portions.

10. An illumination device comprising:
a light source device that emits polarized illumination light including S-polarized light components and P-polarized light components, the light source device including:
   a panel unit that emits the illumination light; and
   an emission side polarizer that is provided on a light emission side of the panel unit;
a light guiding body that guides the illumination light;
an incidence portion that receives the illumination light for the light guiding body; and
an emission portion that emits the illumination light from the light guiding body, the emission portion including a plurality of partially reflecting mirrors that are provided in parallel with each other with an interval therebetween and reflect a part of the illumination light and external light, and transmit a remainder of the illumination light and the external light, the plurality of partially reflecting mirrors including:
   a plurality of first partially reflecting mirrors in which reflectances of the S-polarized light components are relatively higher than reflectances of the P-polarized light components; and
   a plurality of second partially reflecting mirrors in which reflectances of the P-polarized light components are relatively higher than reflectances of the S-polarized light components,
wherein the first partially reflecting mirrors and the second partially reflecting mirrors are alternately arranged in an arrangement direction of the plurality of partially reflecting mirrors, and
a direction of a transmission axis of the emission side polarizer is set such that a direction of a polarization plane of the illumination light incident on the plurality of partially reflecting mirrors is different from both an S-polarization plane direction and a P-polarization plane direction for the plurality of partially reflecting mirrors.

11. A display device comprising:
an image forming device that emits polarized image light including S-polarized light components and P-polarized light components, the image forming device including:
   a panel unit that emits the image light;
   an emission side polarizer that is provided on a light emission side of the panel unit; and
   a first retardation plate on which light that is emitted from the emission side polarizer is incident;
a light guiding body that guides the image light;
an incidence portion that receives the image light for the light guiding body; and
an emission portion that emits the image light from the light guiding body, the emission portion including a plurality of partially reflecting mirrors that are provided in parallel with each other with an interval therebetween and reflect a part of the image light and external light, and transmit a remainder of the image light and the external light, the plurality of partially reflecting mirrors including:
   a plurality of first partially reflecting mirrors in which reflectances of the S-polarized light components are relatively higher than reflectances of P-polarized light components; and
   a plurality of second partially reflecting mirrors in which reflectances of the P-polarized light components are relatively higher than reflectances of the S-polarized light components,
wherein the first partially reflecting mirrors and the second partially reflecting mirrors are alternately arranged in an arrangement direction of the plurality of partially reflecting mirrors.

12. The display device according to claim 11, wherein a direction of a transmission axis of the emission side polarizer is set such that a direction of a polarization plane of the image light incident on the plurality of partially reflecting mirrors is different from both an S-polarization plane direction and a P-polarization plane direction for the plurality of partially reflecting mirrors.

13. The display device according to claim 11, wherein the first retardation plate is a half-wave plate.

14. The display device according to claim 11, wherein the first retardation plate is a quarter-wave plate.

15. The display device according to claim 11,
wherein the image forming device includes a laser light source that emits linearly polarized light as the image light, and
the laser light source is installed such that a direction of a polarization plane of the image light incident on the plurality of partially reflecting mirrors is different from both an S-polarization plane direction and a P-polarization plane direction for the plurality of partially reflecting mirrors.

16. The display device according to claim 11, wherein the image forming device includes a laser light source that emits linearly polarized light as the image light and a second retardation plate on which the image light that is emitted from the laser light source is incident.

17. The display device according to claim 16, wherein the second retardation plate is a half-wave plate.

18. The display device according to claim 16, wherein the second retardation plate is a quarter-wave plate.

19. The display device according to claim 15,
wherein the image forming device includes a light ray flux enlarging element that enlarges a light flux diameter of the image light,
the light ray flux enlarging element is configured with a diffraction element including a lattice pattern that is configured with a plurality of convex portions extending in one direction, and
the image light is incident on the light ray flux enlarging element as light that vibrates in an extending direction of the plurality of convex portions.

* * * * *